(12) United States Patent
Zhao et al.

(10) Patent No.: US 7,887,880 B2
(45) Date of Patent: *__Feb. 15, 2011__

(54) PREPARATION AND APPLICATION OF STABILIZED IRON NANOPARTICLES FOR DECHLORINATION OF CHLORINATED HYDROCARBONS IN SOILS, SEDIMENTS, AND GROUND WATER

(75) Inventors: Dongye Zhao, Auburn, AL (US); Feng He, Auburn, AL (US)

(73) Assignee: Auburn University, Auburn, AL (US)

( * ) Notice: Subject to any disclaimer, the term of this patent is extended or adjusted under 35 U.S.C. 154(b) by 833 days.

This patent is subject to a terminal disclaimer.

(21) Appl. No.: 11/571,390
(22) PCT Filed: Jun. 30, 2005
(86) PCT No.: PCT/US2005/023384

§ 371 (c)(1),
(2), (4) Date: Apr. 26, 2007

(87) PCT Pub. No.: WO2007/001309

PCT Pub. Date: Jan. 4, 2007

(65) Prior Publication Data

US 2008/0190865 A1      Aug. 14, 2008

Related U.S. Application Data

(60) Provisional application No. 60/584,063, filed on Jun. 30, 2004.

(51) Int. Cl.
*B05D 7/00*      (2006.01)
*A62D 3/34*      (2007.01)
(52) U.S. Cl. ............. 427/127; 405/128.15; 405/128.45; 405/128.75; 427/132; 427/216; 427/217; 427/220; 588/316
(58) Field of Classification Search ................. 427/127, 427/132, 212, 216, 217, 220; 405/128.15, 405/128.45, 128.75
See application file for complete search history.

(56) References Cited

U.S. PATENT DOCUMENTS 5,466,609 A     11/1995    Siiman et al.

(Continued)

FOREIGN PATENT DOCUMENTS

WO       2007001309        4/2007

OTHER PUBLICATIONS

NRC (2001) "A risk-management strategy for PCB-contaminated sediments", National Research Council, National Academy Press, Washington DC.

(Continued)

*Primary Examiner*—H. (Holly) T Le
(74) *Attorney, Agent, or Firm*—Andrus, Scales, Starke & Sawall, LLP

(57) ABSTRACT

A stabilized, chemically reactive, metallic nano-material effective for degradation of chlorinated organic compounds in soils, sediments and groundwater. The nano-material is composed of a magnetic metal nanoparticle and a carbohydrate stabilizer bound to the nanoparticle. The preferred metal nanoparticle is iron and the preferred carbohydrate stabilizer is either a starch or a water soluble cellulose such as sodium carboxymethyl cellulose. The nanoparticle may be either mono-metallic, bi-metallic or multi-metallic in nature, but is preferably bi-metallic wherein it is coated with a secondary catalytic metal coating, preferably palladium. A method of making the metallic nano-material is further disclosed wherein a solution of the metal nanoparticle and carbohydrate stabilizer is prepared, and the nanoparticle is then reduced under inert conditions. A process for reductive dechlorination of chlorinated organic compounds is also disclosed wherein the reduced magnetic metal nanoparticle is prepared, and then contacted with a chlorinated organic compound to dechlorinate the compound. Preferably, the nano-material is injected into a site such as soil subsurface or groundwater contaminated with a chlorinated organic compound to provide in-situ dechlorination.

25 Claims, 12 Drawing Sheets

U.S. PATENT DOCUMENTS

| | | | |
|---|---|---|---|
| 5,552,086 | A | 9/1996 | Siiman et al. |
| 5,837,275 | A | 11/1998 | Burrell et al. |
| 5,857,810 | A * | 1/1999 | Cantrell et al. ............... 405/263 |
| 6,712,997 | B2 | 3/2004 | Won et al. |
| 6,719,902 | B1 | 4/2004 | Alvarez et al. |
| 6,777,449 | B2 | 8/2004 | Vance et al. |
| 7,179,660 | B1 | 2/2007 | Kirakossian et al. |
| 7,581,902 | B2 * | 9/2009 | Zhao et al. ............. 405/128.45 |
| 7,635,236 | B2 * | 12/2009 | Zhao et al. ............. 405/128.75 |
| 7,641,971 | B2 * | 1/2010 | Papagianakis .............. 428/403 |
| 2002/0006658 | A1 | 1/2002 | Horn et al. |
| 2002/0006867 | A1 | 1/2002 | Ponder et al. |
| 2003/0039857 | A1 * | 2/2003 | Zhang et al. ................. 428/655 |
| 2003/0134409 | A1 | 7/2003 | Mallouk et al. |
| 2003/0217974 | A1 | 11/2003 | Uegami et al. |
| 2004/0069720 | A1 | 4/2004 | Clausen et al. |
| 2005/0013759 | A1 | 1/2005 | Grow |
| 2005/0051493 | A1 | 3/2005 | Hensman et al. |
| 2005/0133458 | A1 | 6/2005 | Gurol |
| 2005/0199556 | A1 | 9/2005 | Zhang |
| 2007/0203388 | A1 * | 8/2007 | Zhao et al. .................. 588/249 |
| 2007/0256985 | A1 * | 11/2007 | Zhao et al. .................. 210/757 |

PUBLICATIONS

EPA (2000) "EPA Region 4 Alabama NPL/NPL Caliber Cleanup Site Summaries—Capital City Plume." wysiwyg://http://www.epa.gov/region4/waste/npl/nplal/caplumal.htm.

Alford-Stevens, A.L. (1986) "Analyzing PCBs: Basic Information about PCBs and How They Are Identified and Measured." Environ. Sci. Technol., vol. 20, p. 1194-1199.

Grittini, C. et al. (1995) "Rapid Dechlorination of Polychlorinated Biphenyls on the Surface of a Pd/Fe Bimetallic System." Environ. Sci. Technol. vol. 29, p. 2898-2900.

EPA (2002) The PCB Homepage at EPA, http://www.epa.gov/opptintr/pcb.

Berti, W.R. and S.D. Cunningham (1997) "In-Place Inactivation of PB in Pb-Contaminated Soils." Environ. Sci. Technol., vol. 31 p. 1359-1364.

Matheson, L.J. and P.G. Tratnyek (1994) "Reductive Dehalogenation of Chlorinated Methanes by Iron Metal." Environ. Sci. & Technol., vol. 28, p. 2045-2053.

Wang, C.B. and W.X. Zhang (1997) "Synthesizing Nanoscale Iron Particles for Rapid and Complete Dechlorination of TCE and PCBs," Environ Sci & Technol, vol. 31 p. 2154-2156.

Matheson, L.J. and P.G. Tratnyek (1994) "Reductive Dehalogenation of Chlorinated Methanes by Iron Metal." Environ Sci & Technol. vol. 28, p. 2045-2053.

Chuang, F.W. et al. (1995) "Zero-Valent Iron-Promoted Dechlorination of Polychlorinated Biphenyls." Environ. Sci. Technol. vol. 29, p. 2460-2463.

Sayles, G.D. et al. (1997) "DDT, DDD and DDE Dechlorination by Zero-Valent Iron." Environ. Sci. Technol. vol. 31, p. 3448-3454.

Johnson, T.L. et al. (1996) "Kinetics of Halogenated Organic Compound Degradation by Iron Metal," Environ. Sci. Technol. vol. 30 p. 2634-2640.

Orth, S.W. and R.W. Gillham (1996) "Dechlorination of Trichloroethene in Aqueous Solution Using Fe."Environ. Sci. Technol. vol. 30 p. 66-71.

Liang. L. et al. (1997) "Byproduct Formation During the Reduction of TCE by Zero-Valence Iron and Palladized Iron." Ground Water Monit. Rem., Winter Issue, p. 122-127.

Arnold, W.A. and A.L. Roberts (2000) "Pathways and Kinetics of Chlorinated Ethylene and Chlorinated Acetylene Reaction with Fe(0) Particles." Environ. Sci. Technol. vol. 34, p. 1794-1805.

Chuang, F. et al. (1995) "Zero-Valent Iron-Promoted Dechlorination of Polychlorinated Biphenyls." Environ. Sci. Technol. vol. 29, p. 2460-2463.

Hung, H.M. and M.R. Hoffmann (1998) "Kinetics and Mechanism of the Enhanced Reductive Degradation of CCl4 by Elemental Iron in the Presence of Ultrasound," Environ. Sci. Technol. vol. 32, p. 3011-3016.

Alessi, D.S. and Z. Li (2001) "Synergistic Effect of Cationic Surfactants on Perchlorethylene Degradation by Zero-Valent Iron," Environ. Sci. Technol. vol. 35 p. 3713-3717.

Muftikian, R. et al. (1995) "A Method for the Rapid Dechlorination of Low Molecular Weight Chlorinated Hydrocarbons in Water," Water Res. vol. 29, p. 2434-2439.

Li, T. and J. Farrell (2000) "Reductive Dechlorination of Trichloroethene and Carbon Tetrachloride Using Iron and Palladized-Iron Cathodes," Environ. Sci. Technol. vol. 34, p. 173-179.

Zhang, W.X. et al. (1998) "Treatment of Chlorinated Organic Contaminants with Nanoscale Bimetallic Particles," Catal. Today, vol. 40, p. 387-395.

Xu, Y. and W.X. Zhang (2000) "Subcolloidal Fe/Ag Particles for Reductive Dehalogenation of Chlorinated Benzenes," Ind. Eng. Chem. Res. vol. 39, p. 2238-2244.

Schrick, B. et al. (2002) "Hydrodechlorination of Trichloroethylene to Hydrocarbons Using Bimetallic Nickel-Iron Nanoparticles," Chem. Mater. vol. 14, p. 5140-5147.

Glavee, G.N. et al. (1995) "Chemistry of Borohydride Reduction of Iron (II) and Iron (III) Ions in Aqueous and Nonaqueous Media. Formation of Nanoscale Fe, FeB, and Fe2B Powders." Inorg. Chem. vol. 34, p. 28-35.

Zhang, L. and A. Manthiram (1997) "Chains Composed of Nanosize Metal Particles and Identifying the Factors Driving Their Formation," Appl. Phys. Lett. vol. 70, p. 2469-2471.

Raveendran, P. et al. (2003) "Completely 'Green' Synthesis and Stabilization of Metal Nanoparticles," J.Am. Chem. Soc. vol. 125, p. 13940-13941.

Kecskes, L.J. et al. (2003) "Characterization of a Nanosized Iron Powder by Comparative Methods," Powder Science and Technology in Japan, vol. 21, p. 143-150.

Kubatova, A. et al. (2003) "Subcritical (Hot/Liquid) Water Dechlorination of PCBs (Aroclor 1254) with Metal Additives and in Waste Paint," Environ. Sci. Technol. vol. 37, p. 5757-5762.

Hrapovic, L. et al. (2005) "Laboratory Study of Treatment of Trichloroethene by Chemical Oxidation Followed by Bioremediation," Environ. Sci. Technol. vol. 39, p. 2888-2897.

Berti, W.R. and S.D. Cunningham (1997) "In-place Inactivation of Pb in Pb-contaminated Soils," Environ. Sci. Technol. vol. 31, p. 1359-1364.

Matheson, L.J. and P.G. Tratnyek (1994) "Reductive Dehalogenation of Chlorinated Methanes by Iron Metal," Environ. Sci. Technol. vol. 28, p. 2045-2053.

Wang, C.B. and W.X. Zhang (1997) "Synthesizing Nanoscale Iron Particles for Rapid and Complete Dechlorination of TCE and PCBs," Eviron. Sci. Technol. vol. 31, p. 2154-2156.

Gillham, R.W. (2003) "Discussion of Nano-scale Iron for Dehalogenation," Ground Water Monit. Rem. vol. 23, p. 6-8.

Arnold, W.A. and A.L. Roberts (2000) "Pathways and Kinetics of Chlorinated Ethylene and Chlorinated Acetylene Reaction with Fe(0) Particles," Environ. Sci. Technol. vol. 34, p. 1794-1805.

Elliott, D.W. And W.X. Zhang (2001) "Field Assessment of Nanoscale Bimetallic Particles for Groundwater Treatment," Environ. Sci. Technol. vol. 35, p. 4922-4926.

Moran, T. (2004) "New Technology Revolutionizing Groundwater Clean-Up," E-Wire Press Release, http://www.ewire.com.

Li, F. et al. (2003) "Microemulsion and Solution Approaches to Nanoparticle Iron Production of Degradation of Trichloroethylene," Colloids Surf, A vol. 223, p. 103-112.

Suslick, K.S. et al. (1996) "Sonochemical Sythesis of Iron Colloids," J. Am. Chem. Soc. vol. 118, p. 11960-11961.

Khalil, H. et al. (2004) "Synthesis of Zerovalent Nanophase Metal Particles Stabilized with Poly(ethylene glycol)," Langmuir, vol. 20, p. 6896-6903.

Wonterghem, J.V. et al. (1985) "Formation of a Metallic Glass by Thermal Decomposition of Fe(CO)5," Phys. Rev. Lett. vol. 55, p. 410-413.

He F. and D. Zhao (2005) "Preparation and Characterization of a New Class of Starch-Stabilized Bimetallic Glass by Thermal Degradation of Chlorinated Hydrocarbons in Water," Environ. Sci. Technol. vol. 39, p. 3314-3320.

Mondal, K. et al. (2004) "Removal of Selenate by Fe and NiFe Nanosized Particles," Ind. Eng. Chem. Res. vol. 43, p. 4922-4934.

Schrick, B. et al. (2004) "Delivery Vehicles for Zerovalent Metal Nanoparticles in Soil and Groundwater," Chem. Mater. vol. 16, p. 2187-2193.

Ponder, S.M. et al (2000) "Remediation of Cr(VI) and Pb(II) Aqueous Solutions Using Supported, Nanoscale Zero-valent Iron," Environ. Sci. Technol. vol. 34, p. 2564-2569.

Ponder, S.M. et al. (2001) "Surface Chemistry and Electrochemistry of Supported Zerovalent Iron Nanoparticles in the Remediation of Aqueous Metal Contaminants," Chem. Mater. vol. 13, 479-486.

Si, S. et al. (2004) "Size-Controlled Synthesis of Magnetite Nanoparticles in the Presence of Polyelectrolytes," Chem. Mater. vol. 16, p. 3489-3496.

Magdassi, S. et al. (2003) "Silver Nanoparticles as Pigments for Water-Based Ink-Jet Inks," Chem. Mater. vol. 15, p. 2208-2217.

Zhang, L. and A. Manthiram (1997) "Chains Composed of Nanosize Metal Particles and Identifying the Factors drive Their Formation," Appl. Phys. Lett. vol. 70, p. 2469-2471.

Ditsch, A. et al. (2005) "Controlled Clustering and Enhanced Stability of Polymer-Coated Magnetic Nanoparticles," Langmuir, Articles ASAP, DOI: 10.1021/la047057+.

Hosny, W.M. et al. (1997) "Metal Chelates with Some Cellulose Derivatives: V. Synthesis and Characterization of Some Iron(III) Complexes with Cellulose Ethers," Polym. Int. vol. 42, p. 157-162.

Zhao, M., L. Sun, and R.M. Crooks (1998) "Preparation of Cu Nanoclusters within Dendrimer Templates," J. Am. Chem. Soc. vol. 120, p. 4877-4878.

Deacon, G.B., and R.J. Phillips (1980) Relationship between the Carbon-Oxygen Stretching Frequencies of Carboxylato Complexes and the Type of Carboxylate Coordination. Coord. Chem. Rev., vol. 33, p. 227-250.

Jones, F., J.B. Farrow, and W.V. Bronswijik (1998) "An Infrared Study of a Polycrylate Flocculant Absorbed on Hematite," Langmuir, vol. 14, p. 6512-6517.

Kirwan, L.J., P.D. Fawell, W.V. Bronswijik, (2003) "In Situ FTIR-ATR Examination of Poly(acrylic acid) Absorbed onto Hematite at Low pH," Langmuir, vol. 19, p. 5802-5807.

Sylvestre, J.P., et al. (2004) "Stabilization and Size Control of Gold Nanoparticles during Laser Ablation in Aqueous Cyclodextrins," J. Am. Chem. Soc. vol. 126, p. 7176-7177.

Sylvestre, J.P. et al. (2004) "Surface Chemistry of Gold Nanoparticles Produced by Laser Ablation in Aqueous Media," J. Phys. Chem. B. vol. 108, p. 16864-16869.

Liu, J. et al. (2005) "Self Assembly of beta-D Glucose-Stabilized Pt Nanocrystals into Nanowire-like Structures," Chem. Comm. Articles ASAP, DOI: 10.1039/b502342d.

* cited by examiner

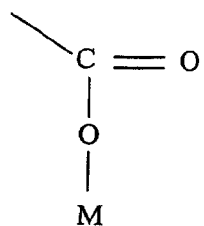 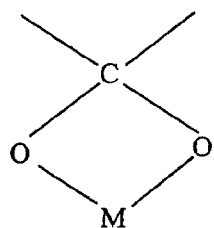 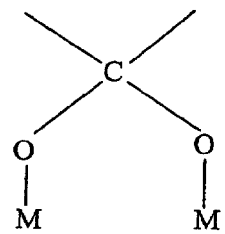
Figure 12A  Figure 12B  Figure 12C
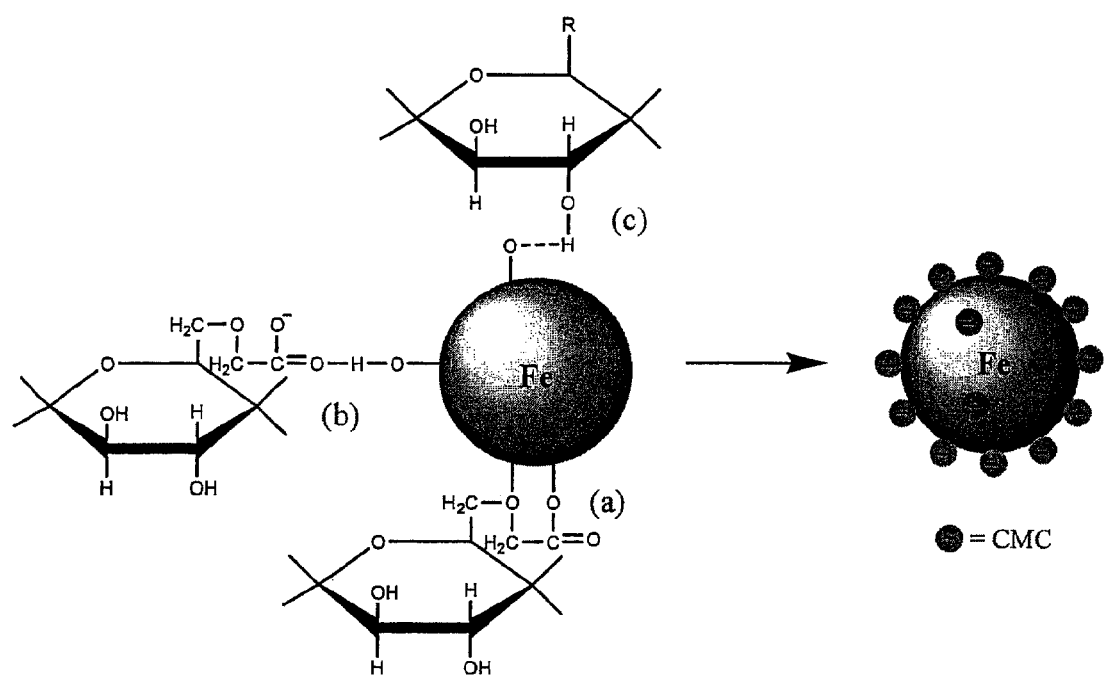
Figure 13

PREPARATION AND APPLICATION OF STABILIZED IRON NANOPARTICLES FOR DECHLORINATION OF CHLORINATED HYDROCARBONS IN SOILS, SEDIMENTS, AND GROUND WATER

CROSS REFERENCE TO RELATED APPLICATION

This application claims priority to and is the utility conversion of U.S. Provisional Patent Application No. 60/584,063, filed Jun. 30, 2004.

STATEMENT REGARDING FEDERALLY SPONSORED RESEARCH OR DEVELOPMENT

This invention was made with United States government support awarded by the following agencies:
EPA STAR Grant No.: GR832373
Department of the Interior Grant Nos.: USGS-01HQ-GRO106 and US GS-01HQGRO106-WHS
The United States has certain rights in this invention.

BACKGROUND OF THE INVENTION

The present invention relates to nano-materials, and more particularly to a new class of stabilized, chemically reactive, metallic nano-materials effective for degradation of chlorinated organic compounds in soils, sediments, and groundwater.

Polychlorinated biphenyls (PCBs), tetrachloroethylene (PCE), and trichloroethylene (TCE) are categorized as chlorinated hydrocarbons, which have been widely used in industries and caused serious groundwater and subsurface contamination in hundreds of sites in the U.S. All three chemicals, as well as their intermediate by-products vinyl chloride (VC), cis-dichloroethene (c-DCE) and trans-dichloroethene (t-DCE), are believed to be potent carcinogens.

PCBs were used in hundreds of industrial applications (e.g., in electrical transformers and as plasticizers in paints and plastics) for their non-flammability, stability, and electrical insulating properties. More than 1.5 billion pounds of PCBs were manufactured in the United States from its first industrial use in 1927 to the cessation of production in 1977. The U.S. EPA estimates that about half of the total domestically consumed PCBs (625,000 tons) were dumped into the environment (soils, sediments, and groundwater) before the enactment of federal regulations in 1976.

PCE and TCE are organic solvents widely used in dry cleaning and metal rinsing. In the past, large amounts of used PCE and TCE were simply dumped into the ground. As a result, high concentrations of PCE and TCE are commonly detected in areas adjacent to dry cleaners, automobile manufacturers or repair shops, asphalt processing plants, and military bases.

For over three decades, it has been a highly challenging task to remediate soils and groundwater contaminated with chlorinated hydrocarbons. Among the numerous remediation technologies are bioremediation including bio-augmentation, pump-and-treat, thermal treatment, permeable reactive barriers (PRB), and excavation followed by landfill. While the pros and cons of these technologies have been documented, there remains a strong need for developing more effective technologies to destroy chlorinated hydrocarbons. For example, bio-augmentation has been used to enhance the slow biodegradation rate of TCE, PCE and/or PCBs. However, this method is challenged by the fact that there has been lacking an effective method for controlling the delivery and distribution of electron-donors and nutrients in the contaminated zone. Traditional pump-and-treat methods can require decades of treatment time and operation costs. Thermal treatment (e.g. steam injection and radio-frequency-heating) demands a prohibitive operating cost and may cause contaminant re-mobilization. Excavation and subsequent landfill of contaminated soil is costly and environmentally disruptive and is highly restricted in residential or industrial areas.

In recent years, abiotic dechlorination using zero-valent iron, Fe(0), particles has enticed increasing interest. By 2003, commercial granular iron particles had been employed in about seventy PRBs to degrade chlorinated hydrocarbons. However, due to limited reactivity, the dechlorination rate using these iron particles is often too slow to be practically viable. For example, the half life of TCE reduction was found in days or longer. As a result, even more toxic intermediate by-products such as VC were often detected.

Two major strategies have been explored to modify granular iron particles for improving the dechlorination reaction kinetics. The first one is to lower the particle size, which in turn increases the particle surface area. Because the dechlorination reaction is a surface-mediated process, increasing the surface area results in enhanced reaction kinetics. The second modification involves coating iron particles with a small quantity (<1% of Fe) of a catalytic metal such as palladium (Pd). The resultant bi-metallic particles were found much more reactive than the mono-metallic iron particles and may prevent the formation of the toxic intermediate by-products. It was reported that Pd-coated nanoscale iron particles can dechlorinate TCE 10-100 times faster than mm-scale granular iron particles.

Compared to traditional passive processes such as the "funnel and gate" or PRB processes, in-situ injection of nanoparticles holds a number of advantages. For example, it can attack the source zone proactively, and it may offer much faster reaction kinetics. However, to be viable, the nanoparticles are required to offer several critical attributes, including 1) the particles must be dispersible in soils for desired reaction period, 2) they must be able to offer prolonged reactivity, and 3) they must be environmentally safe. Currently, Fe(0)-based nanoparticles for remediation purposes are typically prepared by reducing Fe(II) or Fe(III) in the aqueous phase with a strong reducing agent (e.g., sodium borohydride, $NaBH_4$). Compared to other preparation methods such as micro-emulsion-based methods, sonication assisted methods and sol-gel methods, the water-based approach appears to be more suitable for environmental applications because of the minimal use of environmentally intensive solvents or chemicals. However, due to the extremely large area-to-volume ratio and the extremely high energy and reactivity, the initially formed nanoparticles tend to react rapidly with the surrounding media (e.g. dissolved oxygen (DO) or water) and interact with other particles to form much larger (micron to millimeter) agglomerates in a few minutes, thereby losing their mobility in soils and reactivity rapidly. Because of agglomeration the steady-state mean particle size of the "nanoparticles" is actually about 17.7 μm. Because particles of 3 μm or larger are easily retained by soil matrix, the agglomerated iron particles are highly restricted from reaching the contaminants when injected into the ground.

In an attempt to "stabilize" the iron nanoparticles, i.e. to prevent the resultant nanoparticles from agglomeration and to prolong their reactivity, Mallouk and co-workers employed carbon nanoparticles and poly(acrylic acid) (PAA) as supports or "vehicles" for stabilizing and/or delivering iron-based nanoparticles. These supports serve as dispersants and prevent iron particles from agglomeration by shielding the dipole-dipole interactions, and thereby prolong the reactivity of the particles. Significant enhancement of permeability of iron particles was observed when the supported particles were used in both sands and soils (Schrick B.; Hydtusky, B. W.; Blough, J. L.; Mallouk, T. E. Delivery Vehicles for Zerovalent Metal Nanoparticles in Soil and Groundwater, Chem. Mater. 2004, 16, 2187-2193). However, there remains a need for developing an improved stabilized nanoparticle that is able to provide an in-situ and cost-effective process for destruction of chlorinated hydrocarbons in soil and groundwater.

SUMMARY OF THE INVENTION

A class of stabilized, chemically reactive, metallic nano-materials effective for degradation of chlorinated organic compounds in soils, sediments, and groundwater are described herein. In addition, a process for making the nano-material is disclosed, as well as the use of the nano-materials in a cost-effective and in-situ process for destruction of chlorinated hydrocarbons in soils, sediments, and groundwater.

The metallic nano-materials are composed of a magnetic metal nanoparticle, and a stabilizer comprising a carbohydrate bound to the nanoparticle. The magnetic metal nanoparticle is preferably zero valent iron ($Fe^0$), but other metals may be also used such as nickel, cobalt, zinc, copper and manganese as well as alloys of these metals. The carbohydrate may be a polysaccharide such as a starch, a cellulose, and combinations thereof, but is preferably a water soluble starch or sodium carboxymethyl cellulose. The average particle size of the freshly prepared stabilized nanoparticles is about 10 to about 20 nanometers, and after aging for one month, the size remains less than 100 nanometers.

The nanoparticle may optionally be composed of multiple metals, and in one particularly desirable form is bi-metallic and is comprised of a secondary catalytic metal coating in addition to the primary magnetic metal. The secondary metal coating may be palladum (Pd), platinum (Pt), copper (Cu), aluminum (Al), nickel (Ni), zinc (Zn), rhodium (Rh), iridium (Ir), or osmium (Os). The preferred secondary metal coating is palladium (Pd). The metal coated on the nanoparticle functions as a catalyst to increase the chemical reactivity of the magnetic metal nanoparticle.

The method of making the metallic nano-material includes the steps of preparing a solution of magnetic metal nanoparticle and a carbohydrate stabilizer, and thereafter reducing the nanoparticle under inert conditions, and preferably under vacuum using stoichiometric amounts of a reducing agent. The nanoparticle is present in the solution at a concentration of from about 1.0 to about 2.5 g/liter, and the solution contains from about 0.2 to about 1.0% by weight of the stabilizer. The preferred magnetic metal nanoparticle is iron ($Fe^{2+}$ or $Fe^{3+}$), which will be reduced in the preparation process to zero valent iron ($Fe^0$), and the preferred carbohydrate is either a water soluble starch or sodium carboxymethyl cellulose. The reducing agent may be a metal hydride such as sodium borohydride or sodium aluminum hydride, metal naphthalides, hydrazine, alcohols and combinations thereof, but is preferably sodium borohydride. Any mixing steps required in the process are performed by shaking the solution containing the nanoparticle, stabilizer and reducing agent, as opposed to magnetic stirring so as to reduce magnetically induced aggregation of iron particles during the reaction. The starch and/or cellulose stabilizer prevents side reactions (such as reactions between $BH_4^-$ and water during the process, and most of all, prevents the resultant nanoparticles from agglomerating thereby maintaining their highest reactivity.

The method of preparing the nano-material may also include the optional step of coating the reduced magnetic metal nano-particles with a secondary catalytic metal after the reduction step is complete. This may be done by adding from about 0.05% to about 0.1% by weight of the secondary metal to the primary metal (e.g. iron). Other metals may also be loaded onto the nanoparticle in this manner. The end product obtained is thus comprised of a stabilized, chemically reactive, nano-material that may be mono-metallic, bi-metallic, or multi-metallic in nature. The additional metal, e.g. the secondary metal coating, is preferably deposited on the surface of the reduced nanoparticle using redox reactions.

The process for reductive dechlorination of a chlorinated organic compound comprises preparing a stabilized, reduced magnetic metal nanoparticle as disclosed herein, and contacting the reduced magnetic metal nanoparticle with a chlorinated organic compound. As described herein, the reduced magnetic metal nanoparticle may be mono-metallic, bi-metallic or multi-metallic nanoparticles. It has been discovered that these metallic nano-materials are effective to degrade chlorinated organic compounds such as polychlorinated biphenyls (PCBs), trichloroethylene (TCE), tetrachloroethylene (PCE), vinyl chloride (VC), cis-dichloroethene (c-DCE), trans-dichloroethene (t-DCE), as well as other such chlorinated organic compounds in soils, sediments and groundwater. Preferably, the reduced magnetic metal nano-material is injected into a site contaminated with a chlorinated organic compound. The site may be either a soil subsurface or groundwater so that the chlorinated organic compound is dechlorinated in-situ.

The present invention thus provides a physically stable and chemically reactive nano-material effective for degradation of chlorinated organic compounds in soil and groundwater. The nano-material is prepared with the aid of a low cost stabilizer and via a preparation process that is cost effective and provides nanoparticles that remain reactive for extensive periods of time without agglomeration. The degradation rate of chlorinated organic compounds using the new metallic nano-material is more efficient and the rate of degradation is increased compared to prior iron based nano-materials known to date. As a result, the new nano-materials disclosed herein can be injected into contaminated subsurface and actively attack and destroy the contaminate plumes without disturbing the aquafier soil and without causing environmental side effects. Therefore, a cost effective, environmentally benign, in-situ, active remediation technology can be obtained using the new nano-materials disclosed herein.

BRIEF DESCRIPTION OF THE DRAWINGS

In the drawings:

FIG. 12A is a schematic representation of a monodentate chelating mode of metal-carboxylate complexation.

FIG. 12B is a schematic representation of a bidentate chelating mode of metal-carboxylate complexation.

FIG. 12C is a schematic representation of a bidentate bridging mode of metal-carboxylate complexation.

FIG. 13 is a schematic depiction of interactions between the surface of an iron nanoparticle and various functional groups of CMC.

DETAILED DESCRIPTION OF THE INVENTION

Figure 1:
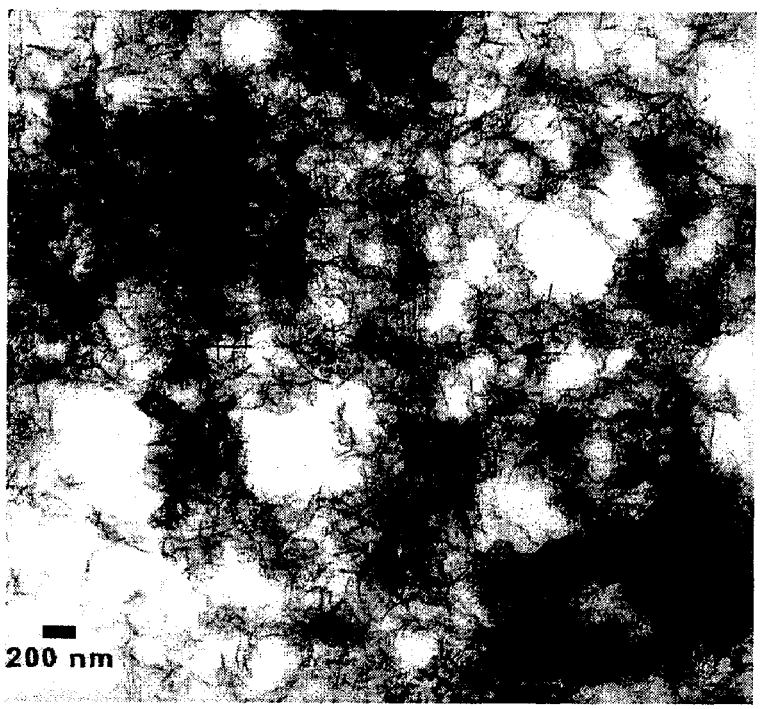
FIG. 1 is a transmission electron micrograph (TEM) image of iron-palladium (Fe—Pd) nanoparticles prepared without a stabilizer.

The stabilized, chemically reactive, metallic nano-material of the present invention is composed of a magnetic metal nanoparticle, and a stabilizer comprising a carbohydrate bound to the nanoparticle. The magnetic metal nanoparticle may be iron, zinc, nickel, cobalt, copper, manganese and alloys of these metals. The preferred metal nanoparticle is iron. As described herein, ferrous ($Fe^{2+}$) or ferric ($Fe^{3+}$) iron is reduced to zero valent iron ($Fe^+$) when producing the metallic nano-material of the present invention. The metallic nano-particle has an average particle size of less than 100 nanometers, but preferably has an average particle size of about 10 to about 20 nanometers. For discrete, non-porous nanoparticles such as those described herein, the particle size determines the surface area. The surface area (S) is inversely related to the particle radius (r) via the following relationship $$r = 3[\rho S]^{-1}$$

where $\rho$ is the density of the metal, e.g. for iron $\rho$ equals 7,870 kg/m$^3$. Therefore, based on a mean radius of 7 nm, the surface area for starch stabilized iron particles would be calculated to be about 55 m$^2$/g, which is much higher than the best reported value of 35 m$^2$/g for nonstabilized particles.

The nanoparticle may be mono-metallic, or may optionally be bi-metallic or multi-metallic in nature. One particularly desirable form is the bi-metallic form in which a secondary catalytic metal coating is applied to the metal nanoparticle in addition to the magnetic metal. The secondary metal coating may be palladium (Pd), platinum (Pt), copper (Cu), nickel (Ni), zinc (Zn), aluminum (Al), rhodium (Rh), iridium (Ir), or osmium (Os). The preferred secondary metal coating is palladium (Pd). The use of the secondary metal coating on the nanoparticle functions as a catalyst to increase the chemical reactivity of the magnetic metal nanoparticle.

The stabilizer is preferably one which is low in cost and environmentally safe. As described herein, carbohydrates have been discovered to provide the physical stability required to prevent agglomeration of the metal nanoparticles. Carbohydrates are organic compounds having the general formula $C_x(H_2O)_y$. The carbohydrates of interest are monosaccharides, disaccharides, trisaccharides, tetrasaccharides, and polysaccharides. Monosaccharides are those carbohydrates where x and y is 5, 6 or 7 in the above formula and are categorized as bioses ($C_2H_4O_2$) such as glycoaldehyde, trioses, ($C_3H_6O_3$) such as glycerose and dioxyacetone, tetroses ($C_4H_8O_4$) such as erythrulose or erythrulose, pentoses ($C_5H_{10}O_5$) such as arabinose, xylose, ribose or arabinulose, hexoses ($C_6H_{12}O_6$) such as dextrose, galactose, mannose, levulose, or sorbose, and heptoses ($C_7H_{14}O_7$) such as mannoheptose. Disaccharides ($C_{12}H_{22}O_{11}$) are those were x is 12 and y is 11 in the above formula and include lactose (milk sugar), maltose (malt sugar), saccharose (cane sugar), melibiose and trehalose. Trisaccharides ($C_{18}H_{32}O_{16}$) are those carbohydrates where x is 18 and y is 16 in the above formula and include melitose and melizitose. Tetrasaccharides ($C_{24}H_{42}O_{21}$) are carbohydrates where x is 24 and y is 21 in the above formula and include lupeose and stachyose. Polysaccharides have the formula $C_x(H_2O)_{x-1}$, are those carbohydrates where x and y is a integer greater than 18 in the above formula. Polysaccharides include gums such as dextrin and vegetable gums, the starch group including starches, inulins, glycogens and lichenins, and the cellulose group including celluloses, and hemicelluloses such as gum Arabic, galactans and agar-agar. The preferred carbohydrate stabilizer is either a water soluble starch or a cellulose, and if a cellulose is preferably a carboxymethyl cellulose and most preferably sodium carboxymethyl cellulose.

Figure 8:
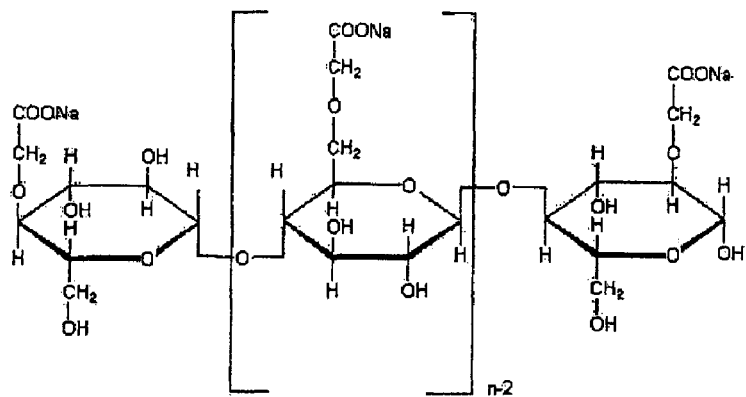
FIG. 8 is a schematic representation of the molecular structure of sodium carboxymethyl cellulose (CMC).

Cellulose is a carbohydrate consisting of a series of hydroglucose units interconnected by an oxygen linkage (also known as beta linkage) to form a linear molecular chain structure. Cellulose can be easily modified to sodium carboxymethyl cellulose (CMC) by replacing the $CH_2OH$ group in the glucose units with a carboxymethyl group. FIG. 8 presents a conceptualized representation of the molecule structure of CMC. CMC is water soluble and is commonly used in food processing. Like starch, CMC is also a low cost and environmentally friendly compound. Although CMC and starch share a similar macro-molecular skeleton, CMC carries much stronger functional groups, i.e. the carboxyl groups, which can offer much stronger interactions with the iron particles to "shield" the iron surface more effectively. Therefore, CMC as well as starch and other carbohydrates are expected to act as stabilizers for the resultant iron nanoparticles.

Figure 18:
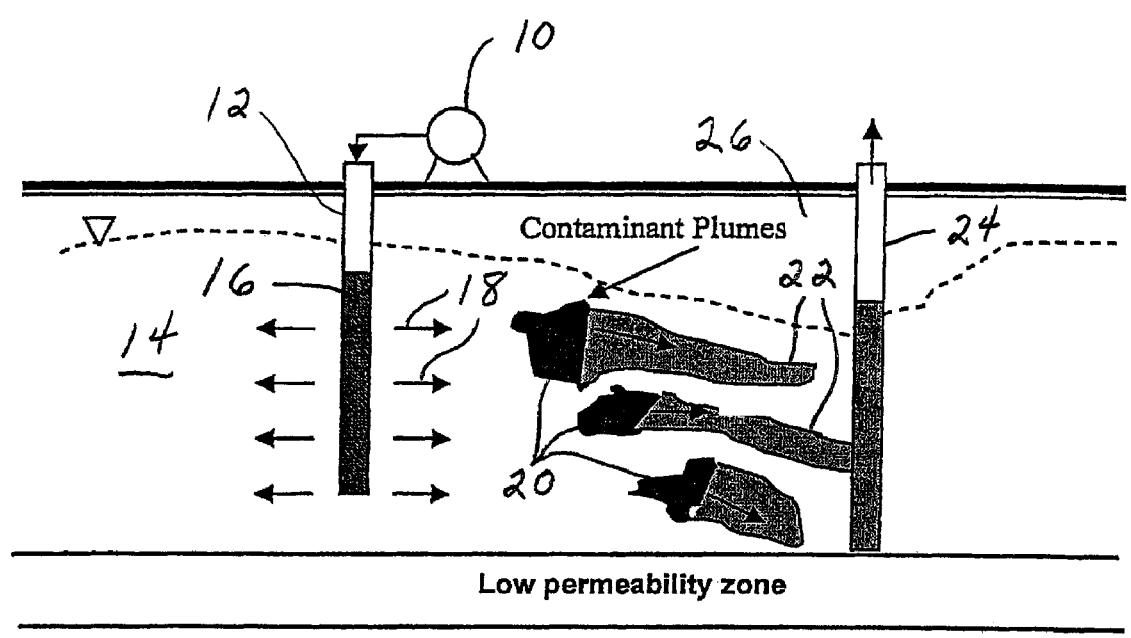
FIG. 18 is a schematic representation of a scheme for in-situ active remediation of soil and groundwater contaminated with chlorinated organic compounds using the nanomaterial of the present invention.

The highly reactive and environmentally safe nano-materials described herein allows for the development of a cost effective technology for in-situ remediation of contaminated soils and ground water by effectively degrading or dechlorinating chlorinated organic compounds. An in-situ, active remediation scheme is shown in FIG. 18. As illustrated, the new nano-material can be readily injected via pump 10 and an injection well (or pipe) 12 into a soil subsurface location 14 to dechlorinate chlorinated organic compounds in-situ. A solution of the nano-material 16 is dispersed into the soil subsurface location 14 as illustrated by arrows 18 so that the nano-material may migrate and contact contaminate plumes 20. Upon contact, the chlorinated organic compounds are degraded and dechlorinated. The remediation efficiency can be monitored through a monitoring well 24, if desired. Remediation can be accomplished via this method without disturbing the aquifier soil 26.

Experimental Section—Starch Stabilizer

Chemicals. The following chemicals were used as received: Trichloroethylene (TCE) (>99%, spectrophotometric grade, Aldrich, Milwaukee, Wis.); 1,1-Dichloroethylene (1,1-DCE) (stabilized 99.9%, Acros Organics, Morris Plains, N.J.); cis-Dichloroethylene (cis-DCE) (97%, Acros Organics, Morris Plains, N.J.); trans-Dichloroethylene (trans-DCE) (100 mg/L in methanol, Ultra Scientific, N. Kingstown, R.I.); Vinyl chloride (VC) (100 mg/L in methanol, Ultra Scientific, N. Kingstown, R.I.); Hexane (pesticide grade, Fisher, Fair Lawn, R.I.); PCBs mixture (Aroclor 1254) (100 mg/L in methanol, Ultra Scientific, N. Kingstown, R.I.); Potassium Hexachloropalladate ($K_2PdCl_6$, 99%, Acros Organics, Morris Plains, N.J.), Ferric Chloride ($FeCl_3$, Fisher, Fair Lawn, R.I.); Sodium borohydride ($NaBH_4$, ICN Biomedicals, Aurora, Ohio); Soluble Starch (Alfa Aesar, Ward Hill, Mass.); Iron powder (100 nm, Argonide, Sanford, Fla.). Deionized water and starch solution were purged with purified $N_2$ for several hours before use to remove dissolved oxygen (DO).

Preparation of Nanoparticles. The preparation of mono- or bi-metallic Fe(0) nanoparticles follows the schematic below:

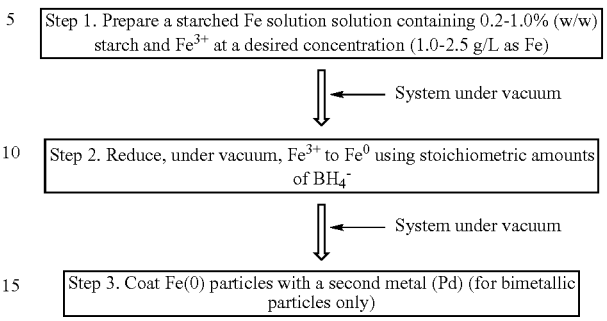

The preparation was carried out in a 250 mL flask attached to a vacuum line. In a typical preparation, a $FeCl_3$ stock was added to solution of starch to yield a solution with desired Fe and starch concentrations. Fe concentration used in this study varied from 0.1 to 1 g/L, whereas starch concentration was ~0.2% (w/w) for TCE and ~0.8%. (w/w) for PCBs. Unlike conventional methods, we applied a low-cost and environmentally friendly carbohydrate (starch) in the preparation. The starch serves as a stabilizer that prevents side reactions (e.g., reaction between $BH_4^-$ and water) during preparation and, most of all, prevents the resultant nanoparticles from agglomeration, thereby maintaining their highest reactivity.

In step 2, $Fe^{3+}$ is reduced to $Fe^0$. To ensure efficient use of the reducing agent $BH_4^-$, the entire reactor system was operated under inert conditions through continuously vacuuming. The flask was shaken by hands (magnetic stirring should be avoided to reduce magnetically induced aggregation of the resultant iron particles) during the reaction. Ferric iron was reduced by borohydride according to the following reaction stoichiometry $$Fe(H_2O)_6^{3+} + 3BH_4^- + 3H_2O \rightarrow Fe^0 + 10\tfrac{1}{2}H_2 + 3B(OH)_3$$

When gas evolution had ceased (after ~15 min), the Fe(0) nanoparticles were either used directly as a mono-metallic agent or loaded with a second metal (Pd) to yield Fe—Pd bi-metallic nanoparticles. The amount of Pd used in this study ranged from 0.05 to 0.1% (Pd:Fe). The palladium was deposited on the iron surface following the following the redox reaction:

$$Pd^{4+} + 2Fe^0 \rightarrow Pd^0 + 2Fe^{2+}$$

Physical Characterization. Transmission electron micrographs were obtained using a Zeiss EM10 Transmission Electron Microscope (Zeiss, Thornwood, N.J.) operated at 25 kv and 40 kv. A 30 μL of aqueous sample containing the nanoparticles was first placed on a formvar-carbon coated copper grid. Wait for 20 minutes to allow full contact/spreading of the droplet and possible deposition of the nano-particles on the grid. Then the droplet was wicked away with filter paper and the grid was allowed to air-dry for 5 minutes. The residual nano-particles attached to the grid were then imaged and photographed using TEM.

A random TEM image including 283 particles was used to obtain particle size distribution. An image processing software named ImageJ was used for analyzing the image (ImageJ was developed and maintained by Wayne Rasband at the Research Services Branch, National Institute of Mental Health, Bethesda, Md., USA (http://rsb.info.nih.gov/ij/)).

Batch Experiments with TCE. Batch experiments were conducted in 65 mL serum bottles containing 63 mL of a solution with a certain type of nanoscale particles. The degradation was initiated by adding 2 mL of TCE stock solution, which resulted in an initial TCE concentration of 25 mg/L, to the solution with the nanoscale particles (no headspace). The bottles were then capped with Teflon Mininert valves and mixed on a rotary shaker (40 rpm) at 22±1° C. in an incubator. At selected time intervals, 0.25 mL of the aqueous solution of TCE was withdrawn using a 250 μL gas-tight syringe into a 2 mL GC vial and extracted with 1 mL of hexane. The extract was then analyzed by a HP 6890 GC equipped with electron capture detector (ECD). Blank experiments without the addition of the nanoparticles were carried out in parallel. The slight reduction in solvent extraction efficiency due to the used of starch was corrected via these blank tests. All experimental points were duplicated.

Batch Experiments with PCBs. Sacrificial batch experiments were conducted in 2 mL GC vials with Teflon-lined caps. Reaction was initiated by injecting 25 μL Aroclor 1254 (100 mg/L) 1 mL solution per vial containing 1 g/L Fe(0) or Fe—Pd nano-particles. The initial concentration of PCBs was 2.5 ppm. The vials were then sealed and mixed on a rotary shaker (40 rpm) at 22±1° C. in an incubator. At predetermined times, the solution was transferred to a 10 mL vial and extracted with 1 mL hexane. The emptied GC vial was also washed using hexane twice in a row (2 mL in wash 1 and 1 mL in wash 2) and during the first wash the vial was also sonicated for 10 minutes to ensure no PCBs were left in the vial. The rinsing hexane was then added into the 10 mL vial containing the solution. Upon mixing and sonication for 5 minutes, the vial was centrifuged for 5 minutes at 1500 rpm to separate the phase. PCBs in the hexane phase were then analyzed using an HP 6890 GC equipped with an HP5 capillary column (32 m long, 0.25 mm ID, Restek Co.) and ECD. All experimental points were duplicated to ensure data precision.

Analytical Methods. The TCE extract was analyzed by a HP 6890 GC equipped with an RTX-624 capillary column (32 m long and 0.32 mm ID, Restek Co.) and an electron capture detector (ECD). The initial oven temperature was set at 35° C. for 8 minutes and ramped to 60° C. at 5° C./min, then to 200 at 17° C./min, and then to 250° C. at 50° C./min. Injector and detector temperatures were both at 250° C. The Carrier gas was helium at a flow rate of 1.7 ml/min and make-up gas was Argon+$CH_4$ at a flow rate of 58.3 ml/min.

Analyses of PCBs were performed using a HP 6890 GC equipped with a HP5 capillary column (32 m long and 0.32 mm ID, Restek Co.) and an ECD. The initial oven temperature was set at 100° C. for 2 min and ramped to 160° C. at 15° C./min, and then to 270° C. at 5° C./min. Injector and detector temperatures were 225° C. and 300° C., respectively. The Carrier gas was helium at a flow rate of 2.3 mL/min and make-up gas was Argon+$CH_4$ at a flow rate of 20 mL/min. Quantification of total Aroclor 1254 was based on the calibration with Aroclor 1254 using 5 major congeners following EPA Method 8082A.

Results and Discussion

Figure 2:
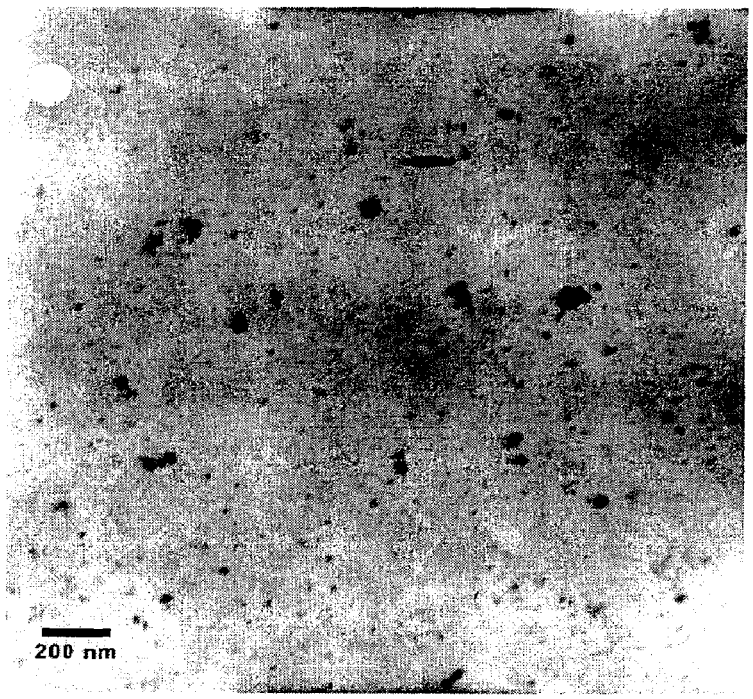
FIG. 2 is a TEM image of Fe—Pd nanoparticles prepared with a starch stabilizer.

Characterization of Iron Nanoparticles. FIGS. 1 and 2 compare the transmission electron micrographs of the Fe—Pd nanoparticles prepared without the starch stabilizer (FIG. 1) and with the starch stabilizer (FIG. 2). FIG. 1 shows that in the absence of the stabilizer the palladized iron particles appear to be fused with each other, forming dendritic agglomerates with varying density. The size of some denser flocs can be well greater than 1 μm. This type of aggregation was attributed to the magnetic forces between the primary metal particles. Possibly owing to the absence of magnetic stirring and absence of DO during preparation, the resultant flocs appear to be looser in structure and thinner in individual tentacles compared to those reported by others, for which greater surface area and reactivity are expected. By contrast, the starch-stabilized Fe—Pd particles shown in FIG. 2 appear to be clearly discrete and well-dispersed, and the particle size falls in the nanoscale range. Similar TEM image of discrete particles was observed for non-magnetic nanoparticles such as copper.

Clearly, the presence of starch prevented agglomeration of the resultant iron particles and thus maintained the highest reactivity of the particles.

Figure 3:
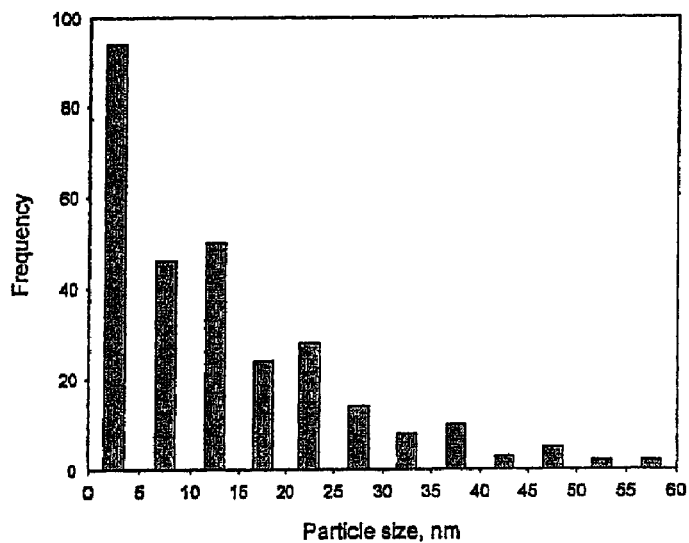
FIG. 3 is a graph of the particle size distribution for the starch stabilized Fe—Pd nanoparticles of FIG. 2.

FIG. 3 presents the particle size distribution for the starch-stabilized Fe—Pd particles. The mean particle diameter was calculated to be 14.1 nm with a standard deviation of 11.7 nm. The maximum particle size observed was ~60 nm. It has been postulated that iron nanoparticles were formed through reduction of $Fe^{3+}$ ions inside the starch templates. The hydroxyl groups of starch act as the passivating contacts and thereby stabilize the nanoparticles formed inside these templates. After 24 hours of storage, the stabilized nanoparticles remain suspended, suggesting that no or minimal particle aggregation was taking place. However, the non-stabilized Fe—Pd particles agglomerated and precipitated in a few minutes after the particles were prepared.

Figure 5:
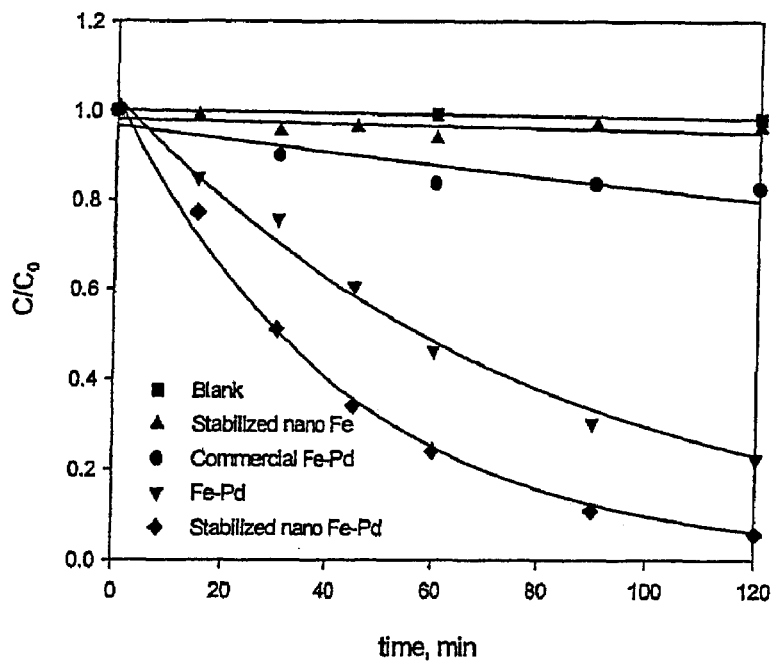
FIG. 5 is a graph of the rate of dechlorination of TCE using starched iron nanoparticles, palladized iron nanoparticles, palladized starched iron nanoparticles, and palladized commercial iron.
Figure 6:
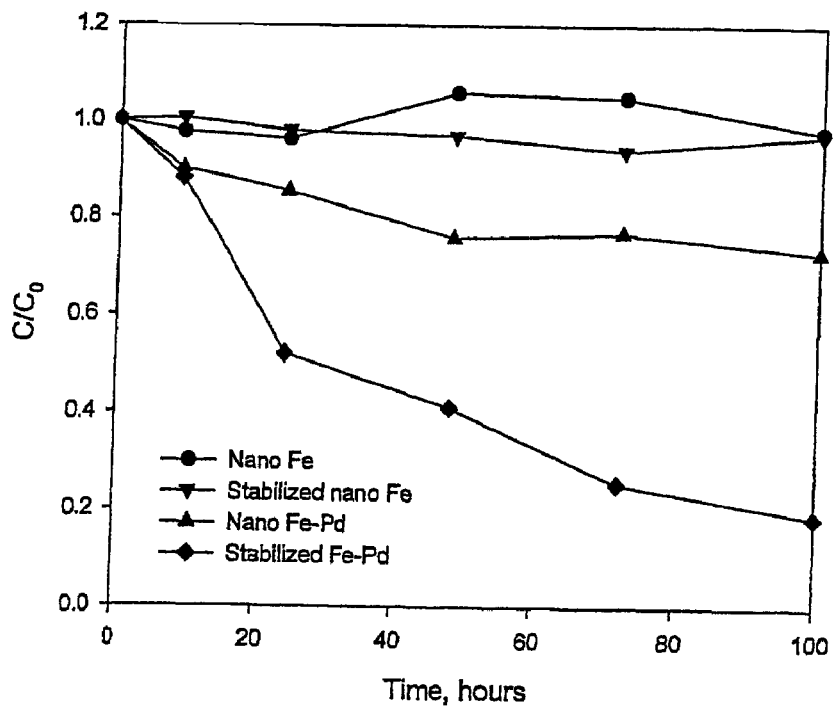
FIG. 6 is a graph comparing the rate of dechlorination of polychlorinated biphenyls (PCBs) using iron nanoparticles, palladized iron nanoparticles, starch stabilized iron nanoparticles, and starch stabilized iron-palladium nanoparticles.

Dechlorination of TCE. FIGS. 5 and 6 compare TCE degradation efficiency using various. Fe(0)-based particles prepared in our lab. The initial TCE concentration was ~25 mg/L in all experiments. For comparison, a commercial "nanoscale" Fe material was also tested (Note: although commercially claimed to be nanoscale, the actual particle size of the commercial Fe-particles appeared to be in the micron-millimeter scale range; the particles precipitate in water rapidly). Each data point reported in all figures represents the mean of duplicates. The maximum standard deviations were: 0.3% for the blank, 0.5% for Starch-stabilized Fe—Pd, 4.5% for non-stabilized Fe—Pd, 1.2% for starch-stabilized Fe, and 0.5% for non-stabilized Fe.

Figure 4:
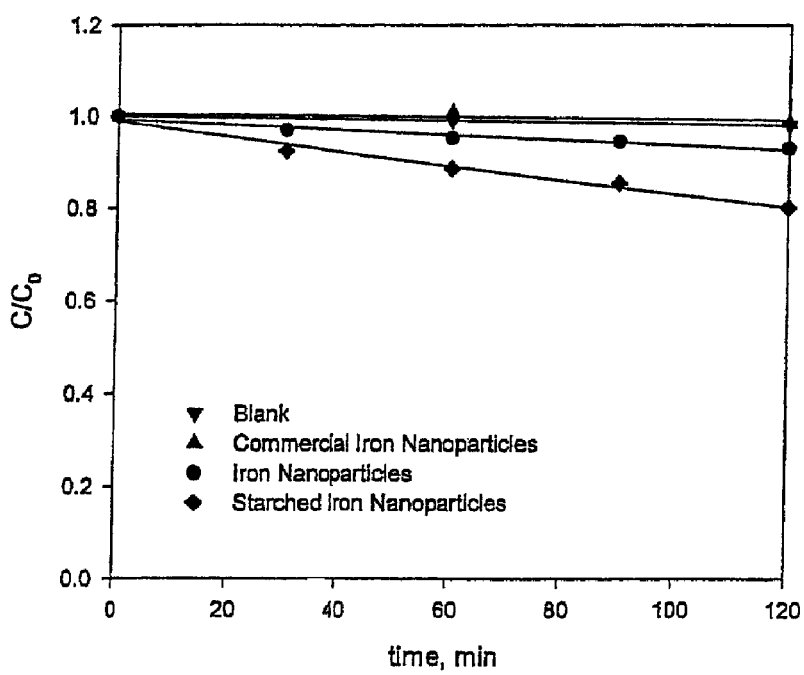
FIG. 4 is a graph of the rate of dechlorination of trichloroethene (TCE) using commercial iron nanoparticles, iron nanoparticles and starched iron nanoparticles.

FIG. 4 illustrates dechlorination of TCE using commercial iron nanoparticles, iron nanoparticles and starched iron nanoparticles. Initial TCE concentration was 25 mg/L. Starch concentration is 0.2% (wt). Each point in FIG. 4 represents mean of duplicates.

FIG. 4 shows that the TCE degradation rate was extremely slow when iron-only nanoparticles were applied. The degradation rate was clearly improved when the starch-stabilized iron nanoparticles were used. Earlier research has reported a higher degradation rate for TCE with similar nanoscale Fe(0) particles but at a much higher Fe dose (~20 g/L). The TCE degradation rate was assumed to follow a pseudo-first-order reaction kinetics. Fitting the TCE degradation date with a pseudo-first rate expression of eqn (3), the pseudo-first-order rate constant, $K_{obs}$, can be determined.

$$-\frac{dC}{dt} = k_{obs}C$$

The observed rate constant $K_{obs}$ was 0.11 $h^{-1}$ for starch-stabilized Fe and 0.034 $h^{-1}$ for non-starch-stabilized Fe particles. No appreciable degradation of TCE was observed when the commercial "nanoscale" iron particles were used. The TCE concentrations in the controls remained unchanged during the course of the experiments.

FIG. 5 illustrates dechlorination of TCE using starched iron nanoparticles, palladized iron nanoparticles, palladized starch iron nanoparticles and palladized commercial iron. Initial TCE concentration was 25 mg/L. Starch concentration is 0.2% (w/w). Fe to solution ratio was 0.1 g/L except for palladized commercial iron (1 g/L). Pd to iron ratio was 0.1 g/100 g.

FIG. 5 shows that degradation of TCE can be greatly enhanced when a small fraction (~0.1 percent of Fe) of Pd was coated on the Fe particles. At the rather modest Fe dose of 0.1 g/L, the non-starched nanoscale Fe—Pd particles prepared under inert conditions were able to eliminate ~78% of TCE in the batch reactor within 2 hours. When the particles were stabilized by starch, over 94% of TCE was destroyed. In contrast, a TCE degradation of only 18% was observed when the commercial Fe particles were palladized and used at a much higher dose (1 g/L). The observed rate constants are 1.5 $h^{-1}$ for starch-stabilized Fe—Pd, and 0.78 $h^{-1}$ for non-stabilized Fe—Pd particles. Halogenated intermediates, such as VC, cis-DCE and trans-DCE, were not detected during the course TCE degradation by either starched or non-starched Fe—Pd particles. Trace amounts (<25 ppb) of 1,1-DCE were detected in the initial stage of TCE degradation using starched Fe—Pd particles. However, 1,1-DCE disappeared after the TCE concentration was lowered to ~6 mg/L. (at 60 min), indicating that 1,1-DCE was also destroyed in this reaction period.

Dechlorination of PCBs. FIG. 6 compares the degradation rates of a standard PCBs mixture (Aroclor 1254) in water using various Fe-based particles, including nanoscale Fe, palladized nanoscale Fe, starch-stabilized nanoscale Fe, and starch-stabilized nanoscale Fe—Pd particles. In all experiments, the initial concentration of PCBs was 2.5 mg/L. Metal to solution ratio was 1 g/L. The Pd to Fe ratio was 0.1%. Again, the data reported represent means of duplicates. The standard deviations were: 2.4% for starch-stabilized Fe—Pd, 7.6% for non-stabilized Fe—Pd, 15% for non-stabilized Fe, and 7.0 for starch-stabilized Fe.

FIG. 6 illustrates degradation kinetics of PCBs using nanoscale Fe particles, palladized iron nanoparticles, starch-stabilized Fe nanoparticles, and starch-stabilized Fe—Pd nanoparticles. Initial PCBs concentration was 2.5 mg/L. Metal to solution ratio was 1 g/L. Palladium to iron ratio was 0.1 g/100 g.

FIG. 6 shows that iron-only nanoparticles (starch-stabilized or not) did not degrade PCBs effectively within a period of 100 hours. Since PCBs are much more recalcitrant than TCE, the results are not surprising. The degradation was clearly enhanced when a small fraction of a catalyst metal Pd was coated on the Fe particles, which resulted in ~24% reduction of PCBs within 100 hours. In contrast, the starch-stabilized bimetallic (Fe—Pd) particles were able to transform over 80% PCBs.

Figure 7A:
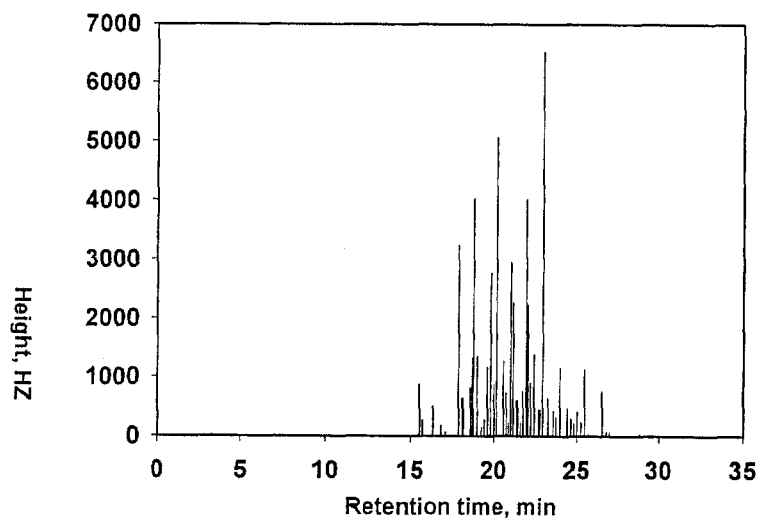
FIG. 7A is a GC chromatogram of a standard mixture of 5 PCBs in water.
Figure 7B:
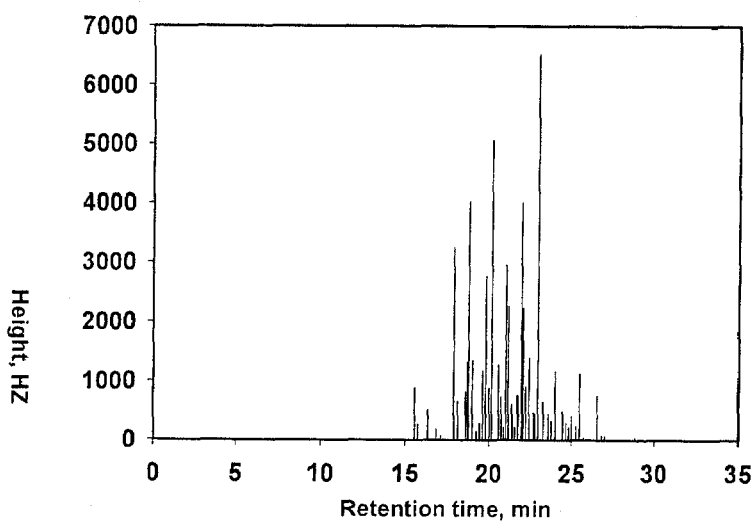
FIG. 7B is a GC chromatograph of a standard mixture of PCBs in water but treated with iron-palladium nanoparticles for 72 hours.
Figure 7C:
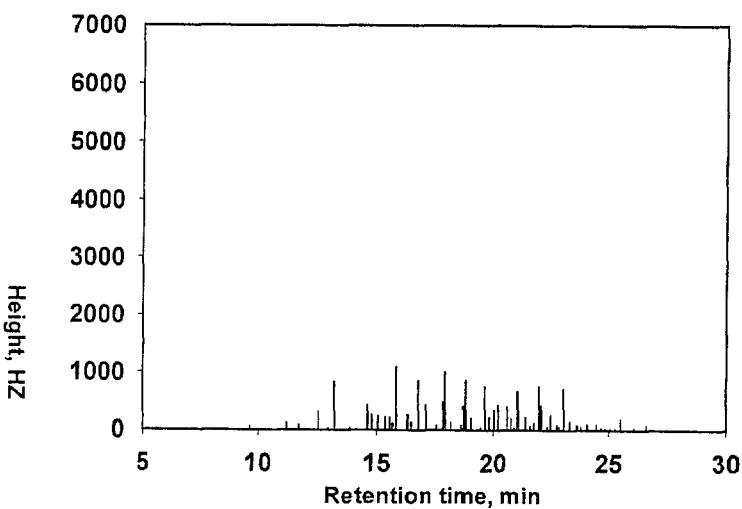
FIG. 7C is a GC chromatograph of a standard mixture of PCBs in water but treated with starch stabilized iron-palladium nanoparticles for 72 hours.

Comparing the GC chromatograms of PCBs with or without treatment, FIG. 7A reveals that PCBs were dechlorinated to form some lower chlorinated congeners. Namely, some intermediate by-products were produced during the reduction of parent PCBs using the Fe—Pd particles (FIG. 7B). However, the application of starch as a stabilizer not only dramatically enhanced the degradation of parent PCBs, but also resulted in much lower levels of by-product congeners, which are expected to continue to be dechlorinated as the reaction proceeds (FIG. 7C).

It should be noted that the total concentration of PCBs was measured based on five major congeners in accord with the EPA method. While the five targeted congeners of PCBs were markedly reduced during the course of degradation, some other less chlorinated compounds were generated as shown in FIG. 7. Due to the lower sensitivity of GC-ECD to the less chlorinated congeners and the complexity and uncertainties of the intermediate products, these by-products were not quantified and identified in this experiment.

Experimental Section—CMC Stabilizer

The goal of this present experiment is to investigate the feasibility of using CMC as a novel stabilizer for preparing physically more stable and chemically more reactive and more durable Fe—Pd nanoparticles for enhanced degradation of TCE or other chlorinated hydrocarbons in soils and water. The specific objective are to 1) prepare a new class of Fe—Pd nanoparticles using CMC as a stabilizer; 2) characterize the CMC-stabilized Fe—Pd nanoparticles by TEM, UV-Vis, and FTIR methods to elucidate the underlying mechanisms; and 3) test the chemical reactivity and longevity of the resultant nanoparticles with TCE as a model chlorinated hydrocarbon.

Chemicals. The following chemicals were used as received: trichloroethylene (TCE) (>99%, spectrophotometric grade, Aldrich, Milwaukee, Wis., USA); 1,1-dichloroethylene (1,1-DCE) (99.9%, Acros Organics, Morris Plains, N.J., USA); cis-dichloroethylene (cis-DCE) (97%, Acros Organics, Morris Plains, N.J., USA); trans-dichloroethylene (trans-DCE) (100 mg/L in methanol, Ultra Scientific, N. Kingstown, R.I., USA); vinyl chloride (VC) (100 mg/L in methanol, Ultra Scientific, N. Kingstown, R.I., USA); hexane (pesticide grade, Fisher, Fair Lawn, N.J., USA); potassium hexachloropalladate ($K_2PdCl_6$, 99%, Acros Organics, Morris Plains, N.J., USA); Iron(II) sulfate heptahydrate ($FeSO_4 \cdot 7H_2O$, Acros Organics, Morris Plains, N.J., USA); sodium carboxymethyl cellulose salt (NaCMC, Average MW 90,000, DS=0.7, Acros Organics, Morris Plains, N.J., USA); sodium borohydride ($NaBH_4$, ICN Biomedicals, Aurora, Ohio, USA); sodium carbonate (Certified A.C.S anhydrous, Fisher, Fair Lawn, N.J., USA); sodium bicarbonate (Certified A.C.S, Fisher, Fair Lawn, N.J., USA).

Preparation of Nanoparticles. Iron nanoparticles were prepared in a similar way as previously used for preparing starch-stabilized nanoparticles except CMC was used as the stabilizer in this example. In brief, the preparation was carried out in a 250 mL flask attached to a vacuum line. Before use, deionized (DI) water and CMC solution were purged with purified $N_2$ for half an hour to remove dissolved oxygen (DO). $FeSO_4 \cdot 7H_2O$ stock solution (0.1M) was prepared freshly before use with degassed DI water. In a typical preparation, $FeSO_4 \cdot 7H_2O$ stock solution was added to the CMC solution through a burette to yield a desired concentration of Fe and CMC. The mixture was purged with $N_2$ for one hour to complete the formation of Fe-CMC complex. Fe concentration used in this study was 0.1 g/L, whereas CMC (in sodium form) concentration was varied from 0.02% (w/w) (i.e. CMC:Fe (M/M)=0.00124) to ~0.2% w/w (i.e. CMC:Fe (M/M)=0.0124).

The Fe(II) ions were then reduced to Fe(0) by adding a stoichiometric amount of sodium borohydride in the mixture. To ensure efficient use of the reducing agent $BH_4^-$, the reactor system was operated under inert conditions through continuously vacuuming. The flask was shaken by hands during the reaction. Ferrous iron was reduced by borohydride according to the following reaction stoichiomety:

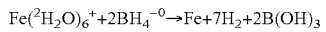

$$Fe(^2H_2O)_6^+ + 2BH_4^{-0} \rightarrow Fe + 7H_2 + 2B(OH)_3$$

When gas (hydrogen) evolution ceased (after ~15 min), the Fe(0) nanoparticles were loaded with a second metal (Pd) to yield the CMC-stabilized Fe—Pd bi-metallic nanoparticles. The amount of Pd used in this study was 0.1% (w/w) of Fe. To test the effect of the particle aging on the reactivity, several replicate samples were stored in a refrigerator at 4° C. for up to 9 days before being used.

Physical Characterization. TEM micrographs were obtained using a Zeiss EM10 Transmission Electron Microscope (Zeiss, Thornwood, N.J., USA). Aqueous sample containing the nano-particles was first placed on a formvar-carbon coated copper grid. To achieve full contact/spreading of the droplet and possible deposition of the nano-particles on the grid, the grid was allowed to $N_2$-dry for 1 day. The residual nano-particles attached to the grid were then imaged and photographed.

FTIR measurements were carried out to explore the modes of interactions between CMC and iron nanoparticle surface. The solution containing CMC-stabilized nanoparticles was first high-speed (9000 g) centrifuged. Upon removal of the supernatant, the resultant solid deposit was rinsed with DI water, and then dried under vacuum for 24 hours. The dried sample was mixed with KBr to obtain the KBr pellets that contain 1.5% (w/w) of the nanoparticle sample. FTIR spectra of the CMC-stabilized nanoparticles were then recorded by shooting the KBr pellets with a Nicolet AVATAR 360 E.S.P spectrometer (Nicolet, Madison, Wis., USA). For comparison, FTIR spectra for CMC only were also obtained in a similar manner.

Degradation of TCE. Batch experiments were conducted in 43 mL amber glass vials, filled with 43 mL of a solution containing a certain type of nanoscale particles (the headspace was set to nearly zero to minimize volatilization loss of TCE). TCE degradation was initiated by spiking 50 μL of a TCE stock solution (43 g/L TCE in methanol) into the solution containing the nanoparticles, which resulted in an initial TCE concentration of 50 mg/L. The bottles were then capped with Teflon Mininert valves and mixed on a rotary shaker (40 rpm) placed in an incubator at 22±1° C. At selected time intervals, 0.1 mL of the aqueous sample was withdrawn using a 100 μL gas-tight syringe. Then the sample was transferred into a 2 mL GC vial containing 1 mL of hexane for extraction of TCE. Upon phase separation, the extract was analyzed for TCE using a HP 6890 GC equipped with electron capture detector (ECD). Control experiments (without the addition of the nanoparticles) were carried out in parallel. All experimental points were duplicated to assure the data quality.

To examine the completeness of TCE dechlorination, both TCE degradation and chloride production were followed in another set of sacrificial batch experiments conducted in the same fashion as described above except that duplicates were sacrificed at each sampling time. TCE remaining in the sacrificed vials was analyzed in the same manner as before. In addition, the solution was filtered by 0.22 μm membrane (Millipore, Billerica, Mass.), and the filtrate was then analyzed for chloride.

Analytical Methods. TCE and its daughter chlorinated products (DCE, VC) in hexane were analyzed using a HP 6890 GC equipped with an RTX-624 capillary column (32 m long and 0.32 mm ID, Restek Co, Bellefonte, Pa., USA) and an ECD. The initial oven temperature was set at 35° C. for 8 minutes and ramped to 60° C. at 5° C./min, then to 200 at 17° C./min, and then to 250° C. at 50° C./min. Injector and detector temperatures were both set at 250° C. The Carrier gas was helium at a flow rate of 1.7 mL/min and make-up gas was Argon+$CH_4$ at a flow rate of 58.3 mL/min. The detection limits were 5 μg/L for TCE, 15 μg/L for 1,1-DCE, 50 μg/L for VC, and ~1 mg/L for cis-DCE or trans-DCE. Chloride was analyzed using a Dionex Ion Chromatography (DX-120, Dionex, Sunnyvale, Calif., USA) equipped with an AS14 column, an AG14 guard column and a 100 μL sample loop. The eluant used was a mixture of sodium carbonate ($3.5 \times 10^{-3}$ M) and sodium bicarbonate ($1.0 \times 10^{-3}$ M).

Results and Discussion

Figure 9A:
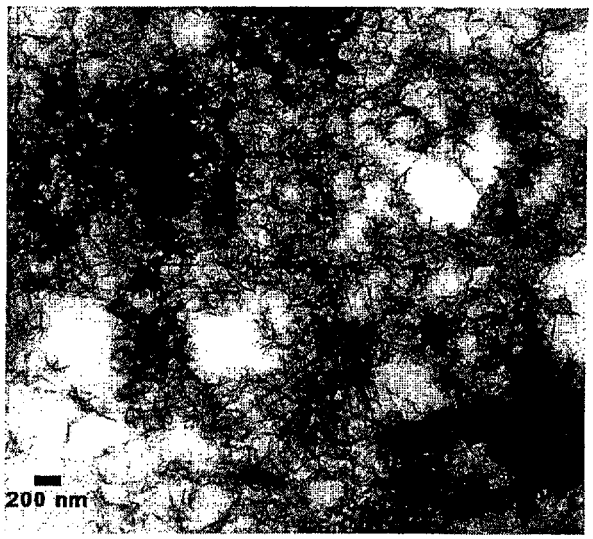
FIG. 9A is a TEM image of fresh palladium iron nanoparticles prepared without CMC.
Figure 9B:
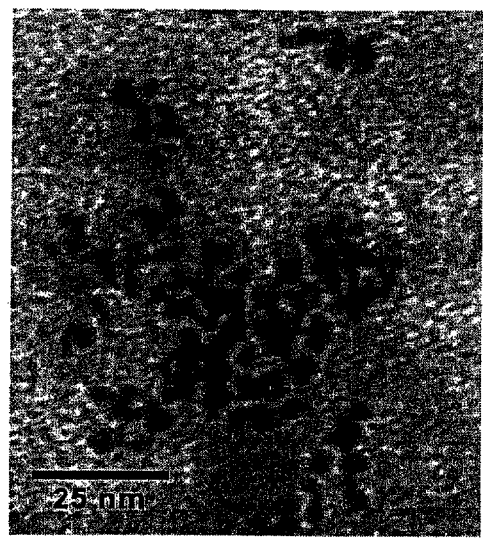
FIG. 9B is a TEM image of fresh iron-palladium nanoparticles prepared with 0.2% CMC.
Figure 9C:
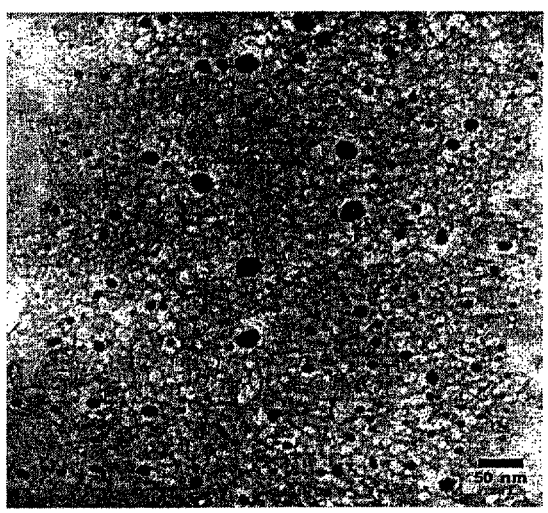
FIG. 9C is a TEM image of iron-palladium nanoparticles prepared with 0.2% CMC after one day of storage.
Figure 9D:
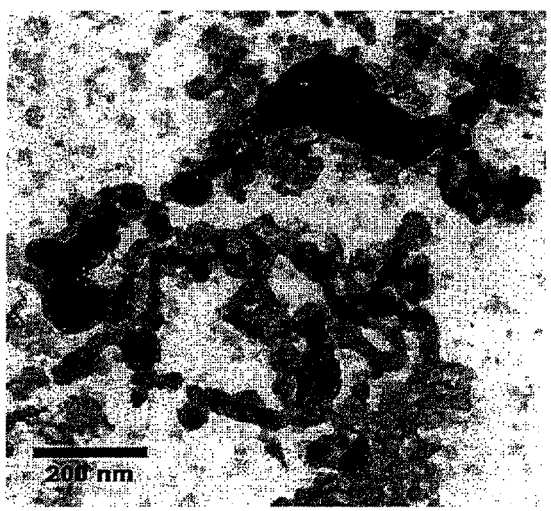
FIG. 9D is a TEM image of fresh iron-palladium nanoparticles prepared with 0.1% CMC.

TEM Characterization of CMC-Fe nanoparticles. FIGS. 9A-9D compare the TEM images of the Fe—Pd nanoparticles prepared in the absence of CMC (FIG. 9A) or in the presence of CMC at various CMC concentrations or ages (FIGS. 9B, 9C, 9D). FIG. 9A shows that in the absence of the stabilizer the freshly prepared Fe—Pd particles appeared as much bulkier dendritic flocs with varying density. The size of some denser flocs was greater than 1 μm. This type of aggregation was attributed to the magnetic and/or van der Waals forces between the Fe(0) particles. In contrast, the fresh CMC-stabilized Fe—Pd particles shown in FIGS. 9B and 9C appeared as much finer nanoparticles with an average particle diameter (D) of 4.57 nm (standard deviation=0.52 nm). Based on the mean radius, the surface area for the fresh CMC-stabilized nanoparticles was calculated to be ~167 $m^2 g^{-1}$ with the following equation, $$r = 3[\rho^* S]^{-1}$$

where r is the average particle radius, ρ is the density of Fe (7,870 kg $m^{-3}$) and S is the particle surface area. Evidently, the presence of CMC effectively prevented the agglomeration of the resultant iron particles and thereby maintained the highest surface area of the particles.

The CMC-stabilized Fe—Pd nanoparticles exhibited superior physical stability in water. While non-stabilized particles precipitated nearly completely in a few minutes, the stabilized particles remained fully suspended after 1 day of storage. As shown in FIG. 9B, after 1 day of storage, the particles remained well-dispersed although the mean particle diameter (D) increased from 4.57 nm to 8.1 nm with a standard deviation of 5.35 nm. The increase in particle size and the decrease in mono-dispersibility of the particles (i.e. the widened particle size distribution) suggest that even in the presence of CMC, the particle agglomeration was still developing although CMC dramatically slowed down the process. Because of the size growth, the surface area for the 1-day aged CMC-stabilized particles reduced to 94.2 $m^2 g^{-1}$.

FIG. 9D shows that when the concentration of CMC was reduced to 0.1% (w/w) (or a CMC:Fe molar ratio of 0.0062), the resultant iron nanoparticles would aggregate but the agglomerates appeared somewhat more "amorphous" compared to the non-stabilized particles shown in FIG. 9A. As to be discussed later on, the CMC concentration does not only affect the physical stability, it also controls the reactivity of the resultant Fe—Pd nanoparticles. Therefore, an minimum CMC:Fe molar ratio needs to be satisfied for effective stabilization.

Figure 10:
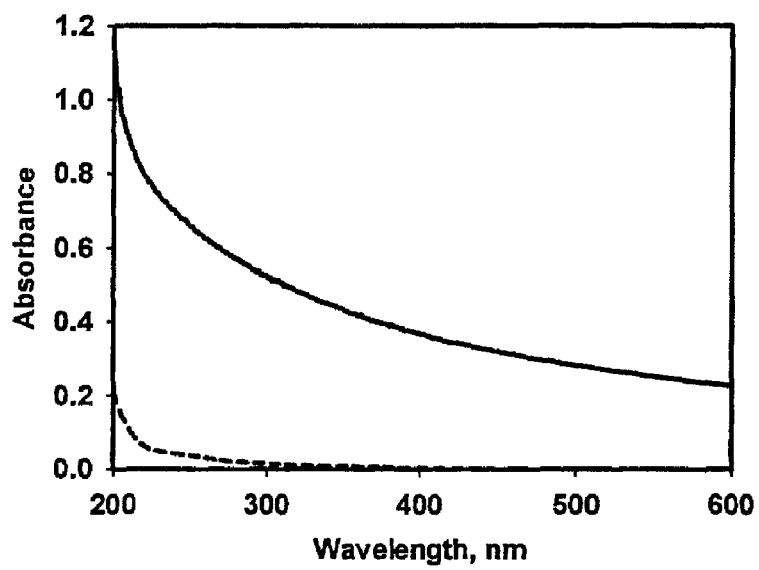
FIG. 10 is a graph illustrating the UV-Vis absorption spectra of a solution containing 5 µg/liter of iron (Fe II) and 0.01% by weight sodium carboxymethyl cellulous before, and after, reduction with sodium borohydride.

Optical Characteristics of CMC-Stabilized Nanoparticles. As shown in FIG. 8, the key difference between CMC and its parent cellulose lies in the carboxymethyl group in each subunit of a CMC molecule. The carboxymethyl group renders the cellulose molecule highly water-soluble. The $pK_a$ value of CMC has been reported to be 4.3. In the preparation of CMC-stabilized nanoparticles, the pH of the plain CMC solution was around ~6.70 at 0.2% of CMC (~6.85 at 0.1% of CMC). Upon addition of Fe(II), the solution pH was lowered to ~5.8. Therefore, the functional carboxylic groups in CMC are expected to be fully disassociated, and to strongly interact with the metal cations (Lewis acids) through concurrent ion-pairing and Lewis acid-base interactions. The Fe(II)-CMC interactions can be further enhanced through interactions between Fe(II) and the hydroxyl groups and/or the ether groups in CMC. As a result, rather strong Fe(II)-CMC complexes are formed. The color of the Fe(II)-CMC complex was light green, giving a weak absorption in low wavelength region in UV-Vis spectra as shown in FIG. 10. With the addition of the strong reductant (NaBH$_4$, added at 4 times the stoichiometric amount), the solution color changed quickly to black and pH rose to 7.80.

Accordingly, the UV-Vis spectrum changed to a monotonic and nearly exponential decaying profile as the wavelength increased. This behavior results from the appearance of a new inter-band transition arising from the formation of Fe clusters. The exponential decaying shape is characteristic of a band-like electronic structure, which strongly suggests that the reduced Fe(0) does not exist as isolated atoms, but rather as clusters.

FTIR Characterization of CMC-Fe Nanoparticles and Nature of Fe-CMC Interactions. It is postulated that as Fe clusters are formed, the CMC molecules are anchored on the iron particle surface through the interactions between the nanoparticles and the terminal functional groups of CMC. As a result, the nanoparticles are encapsulated with a thin layer of negatively charged CMC. This protective layer prevents the nanoparticles from agglomerating with other nanoparticles due to the electrostatic repulsion between the negatively charged functional groups of CMC molecules. To elucidate the stabilization mechanisms and to gain further insight into the interactions between the CMC macromolecules and the iron nanoparticles, FTIR measurements were carried out on the pure CMC stabilizer and the CMC-stabilized iron nanoparticles. FIGS. 5A and 5B compares the characteristic stretching frequencies for the CMC macromolecules and for the CMC-stabilized iron nanoparticles. The assignments of the peaks are provided in Table 1. The main characteristic stretching frequencies of CMC included the asymmetric (more C=O character) and symmetric (more C—O character) stretching frequencies of the carboxylate group (COO$^-$) at 1604 and 1421 cm$^{-1}$, respectively, the O—H stretching at 3447 cm$^{-1}$, the C—O—C stretching at 1157 cm$^{-1}$ (R$_2$CHOCHR$_2$) and 1113 cm$^{-1}$ (RCH$_2$OCH$_2$R), and C—O stretching at 1061 cm$^{-1}$ (RCH$_2$OH) and 1025 cm$^{-1}$ (R$_2$CHOH). If CMC molecules are adsorbed to the surface of the clustered Fe nanoparticles, the stretching frequencies of the functional groups of CMC are expected to shift significantly.

TABLE 1

FTIR Peak Assignments for CMC and CMC-Encapsulated Iron Nanoparticles.

| Peak positions (cm$^{-1}$) | | |
|---|---|---|
| CMC | CMC-Coated Iron Nanoparticles | Assignment |
| 3447 | 3419 | O—H stretch |
| 2922 | | asymmetric CH$_2$ stretch |
| | 1731 | Hydrogen bonded C=O |
| 1604 | 1620 | COO$^-$ (asymmetric) |
| 1421 | 1343 | COO$^-$ (symmetric) |
| 1328 | | O—H in-plane |
| 1157 | | C—O—C stretch (RCHOCHR) |
| 1113 | | C—O—C stretch (RCH$_2$OCH$_2$R) |
| 1061 | 1061 | C—O stretch (RCH$_2$OH) |
| 1025 | | C—O stretch (R$_2$CHOH) |

As shown in FIGS. 12A, 12B and 12C, the complexation between a carboxylate group and a metal such as Fe(0) may take place in three fashions: monodentate (FIG. 12A), bidentate chelating (FIG. 12B), and bidentate bridging (FIG. 12C). The separation of the symmetric and asymmetric stretches ($\Delta v = v_{asym} - v_{sym}$) of the carboxylate group can be used to identify the bonding mechanism when compared to that of the corresponding carboxylate salt:

(i) If there is a characteristic C=O band in the spectrum and $\Delta v$(adsorbed) is greater than $\Delta v$(salt), then the adsorbed structure is monodentate.

(ii) If there is no characteristic C=O band in the spectrum and $\Delta v$(adsorbed) is smaller than $\Delta v$(salt), then the adsorbed structure is bidentate chelating.

(iii) If there is no characteristic C=O band in the spectrum and $\Delta v$(adsorbed) is similar to $\Delta v$(salt), then the adsorbed structure is bidentate bridging.

In addition, Jones et al. (Jones, F.; Farrow, J. B.; Bronsijk, W. V. An Infrared Study of a Polyacryalte Flocculant Adsorbed on Hematite. Langmuir 1998, 14, 6512-6517) proposed an asymmetric bidentate bridging structure based on diffuse reflectance infrared Fourier transform (DRIFT) studies of a polyacrylate flocculant adsorbed on hematite. The structure was based on the fact that $\Delta v$ (adsorbed) was much greater than $\Delta v$ (salt) but had a lack of substantial C=O characteristics.

Figure 11A:
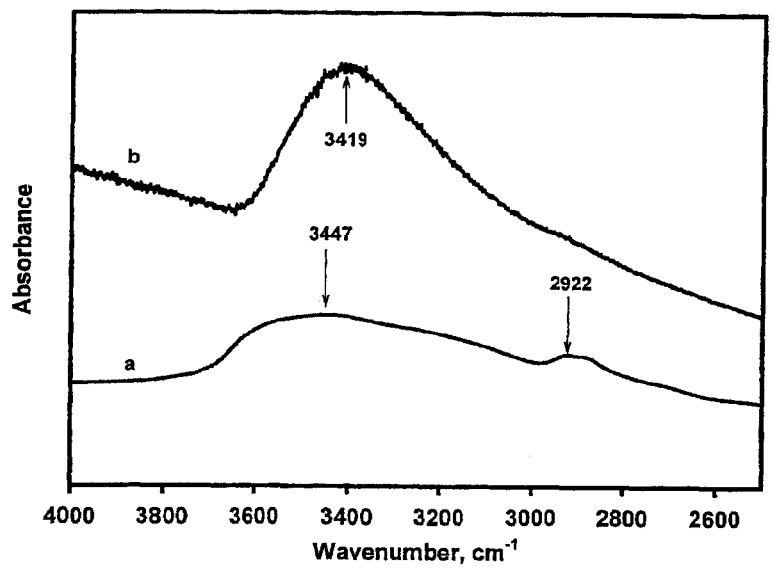
FIG. 11A is a graph of the Fourier transform infrared spectroscopy (FTIR) data illustrating the stretching frequencies between wave numbers 4,000 and 2,600 for the pure CMC stabilizer as well as for the CMC-stabilized iron nanoparticles.
Figure 11B:
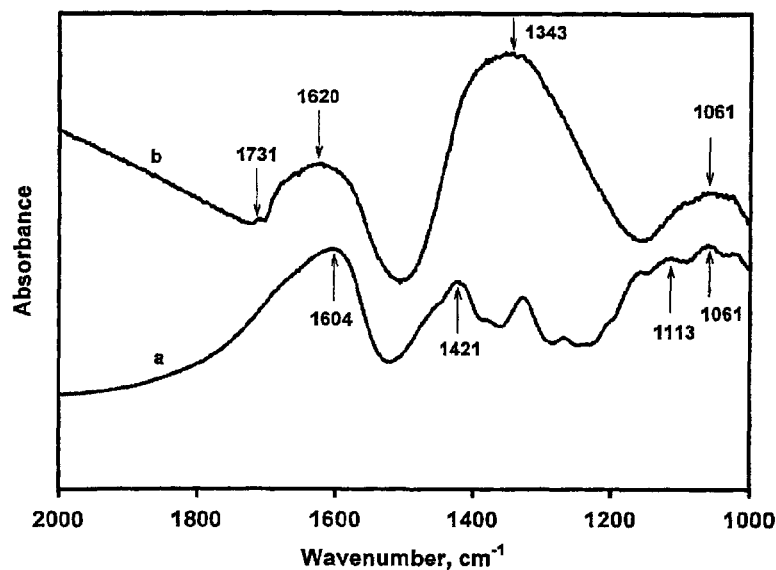
FIG. 11B is a graph similar to FIG. 11A of the FTIR data for the CMC stabilizer and the CMC-stabilized iron nanoparticles illustrating the stretching frequencies between the wave numbers 1,000 and 2,000.

It is evident from FIGS. 11A and 11B that the asymmetric COO$^-$ stretching shifts from 1604 cm$^{-1}$ in CMC to 1620 cm$^{-1}$ in CMC-Fe, whereas the symmetric COO$^-$ stretching from 1421 cm$^{-1}$ to 1343 cm$^{-1}$. The $\Delta v$(adsorbed)(=1620−1343=277 cm$^{-1}$) is much greater than $\Delta v$(salt)(=1604−1421=183 cm$^{-1}$).

Therefore, the binding mode between CMC and Fe conforms to the first scenario, i.e. it is facilitated through monodentate metal-carboxylate complexation. The monodentate complexation mechanism also explains the observed red shift of $v$ (asymmetric COO$^-$) from 1604 cm$^{-1}$ to 1620 cm$^{-1}$ because the coordination bonding between the oxygen atom in the carboxymethyl group and metal enhances the double bonding property of the carbonyl groups.

It is also noteworthy that the C—O—C (RCH$_2$OCH$_2$R) stretching (1113 cm$^{-1}$) in CMC disappears upon the formation of CMC-Fe nanoparticles. This observation indicates that the oxygen atom in the ether group is also involved in binding with the iron nanoparticles (34). Based on the same observation, Hosny et al. proposed that the complexation of CMC with Fe(III) is facilitated through both the oxygen of C—O in COO$^-$ and the oxygen in the ether group.

The mode of metal-ligand interaction is often pH-dependent. Jones et. al. (Jones, F.; Farrow, J. B.; Bronsijk, W. V. An Infrared Study of a Polyacryalte Flocculant Adsorbed on Hematite). Langmuir 1998, 14, 6512-6517) found that at pH 7.0 the polyacrylate adsorbed onto hematite in an essentially monodentate configuration. At this pH there was a significant degree of hydrogen bonding between the C=O group of polyacrylate and either the hydrogen of the hydroxylated hematite or the water. At higher pH (11-14) the monodentate configuration was much less evident and an asymmetric bidentate bridging structure was observed. In our case, the pH of iron nanoparticle solution was around 7.8. As discussed above, both the carboxylic groups and the ether groups are involved in binding CMC to the Fe nanoparticles. In addition, the appearance of a new small band in FIG. 11B at 1731 cm$^1$, which has been attributed to hydrogen bonded C=O groups, suggests that the C=O group may also be attached to the surface of the Fe nanoparticles through hydrogen bonding. Obviously, this H-bond-mediated interaction can only take place when the C=O group is in the intimate proximity to the Fe surface and Fe surface is able to form or interact with H-bonds, for example, when it is partially hydroxylated (Fe—OH) in the presence of water as commonly is the case. A similar version of H-bonding can also take place when the carboxylate groups are not fully dissociated, in which case the C—O—H groups will facilitate the H-bonding. However, this version of interaction was not evident in our case.

Studies have demonstrated that hydrogen bonding existed between the partially hydroxylated Au nanoparticle surface and the —OH groups in cyclodextrins (CDs), which allowed the stabilization of gold nanoparticles by CDs. According to these studies, the partially hydroxylated Au surface has a pKa of 3.2. When solution pH is higher than the pKa value, Au—O⁻ groups are formed on the nanoparticle surface, which can interact with the —OH groups in cyclodextrins through hydrogen bonding. This kind of H-bonding was believed to be much stronger than the hydrogen bonding between two —OH groups, and its presence was confirmed by the FTIR spectra. Similar mechanism was also proposed by Liu et al. recently to explain the self-assembly of β-D-glucose-stabilized Pt nanocrystals into nanowire-like structures. In the present work, partially hydroxylated iron nanoparticles may contain the negatively charged Fe—O⁻ surface groups at the solution pH 7.8. As a result, hydrogen bonding between the iron nanoparticles and CMC is also likely operative. The fact that the —OH stretching band shifts from 3447 $cm^{-1}$ for CMC to 3419 $cm^{-1}$ for CMC-Fe (FIG. 11A) suggests an enhanced strength of intermolecular hydrogen bonding. In summary, FIG. 13 provides a conceptualized depiction of various possible interactions between the Fe surface and different functional groups (O—H, C—O—C, C—O⁻, C=O) of CMC. Although all these modes of interactions are likely concurrently operative, the attachment of CMC is likely predominated by the observed monodentate binding due to the carboxylate group since the C—O⁻ group is a much stronger donor group than the other functional groups of CMC.

Figure 14A:
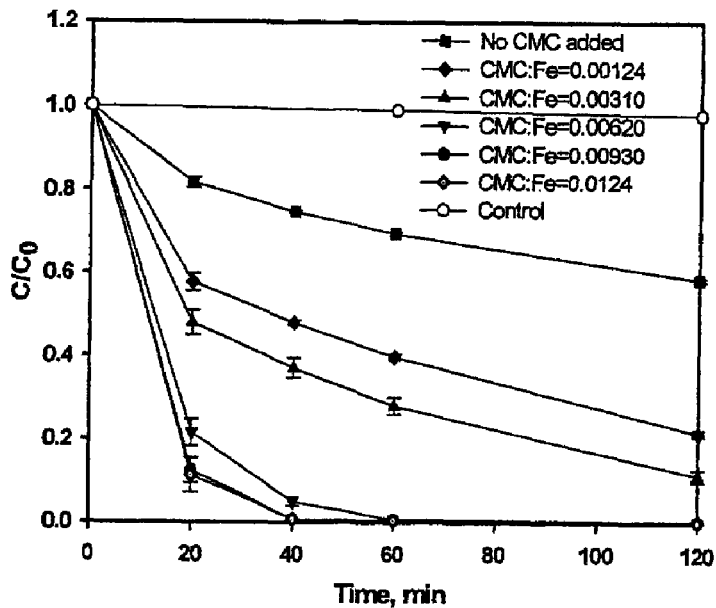
FIG. 14A is a graph illustrating dechlorination of TCE using CMC-stabilized iron-palladium nanoparticles carried out at various CMC concentrations, but with a fixed iron concentration of 0.1 g/liter.
Figure 14B:
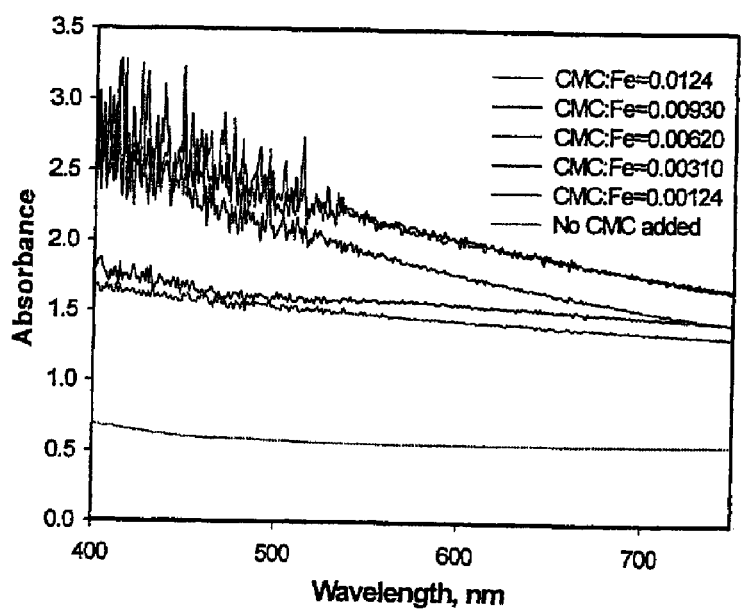
FIG. 14B is a graph of the UV-Vis absorbance spectra of solutions containing the various iron-palladium nanoparticles prepared in FIG. 14A.

Effect of CMC-to-Fe Molar Ratio on Particle Stabilization. As shown in the TEM studies, a sufficient dose of CMC (i.e. the CMC:Fe molar ratio) was necessary to achieve effective stabilization of the resultant nanoparticles. To determine the effect of CMC:Fe molar ratio on the physical stability and the chemical reactivity of the nanoparticles, TCE degradation tests were carried out at various CMC:Fe ratios but at a fixed Fe concentration of 0.1 g/L (FIG. 14A). To compare corresponding changes in optical characteristics of the resultant particles, UV-vis absorbance spectra were also recorded (FIG. 14B).

Assuming that TCE degradation follows a pseudo-first-order reaction kinetics, the observed pseudo-first-order rate constant, $K_{obs}$, can be determined by fitting the pseudo-first rate expression of eqn (3) to the experimental data, $$-\frac{dC}{dt} = k_{obs}C$$

where C is the concentration of TCE remaining at time t. Table 2 gives the values of $K_{obs}$ at various CMC:Fe molar ratios.

FIG. 14A clearly reveals that the CMC stabilization tremendously enhanced the reactivity of the Fe—Pd nanoparticles. When CMC:Fe ratio was increased from 0 to 0.00930, the rate constant increased from 0.0041 $min^{-1}$ to 0.12 $min^{-1}$ (a factor of 29). Accordingly, the UV-Vis absorbance of the iron particles became progressively intensive as shown in FIG. 14B. Interestingly, when the CMC:Fe molar ratio was increased further from 0.00930 to 0.0124, both the TCE degradation rate and UV-Vis absorption remained nearly the same. Evidently, a minimum CMC:Fe molar ratio of 0.0093 is needed to achieve the maximum stabilization or reactivity of the nanoparticles, and excessive amounts of the stabilizer did not appear to further enhance the stability of the iron nanoparticles.

In our previous study, a water-soluble starch was successfully used to stabilize the same nanoparticles. Compared to the starch-stabilized Fe—Pd nanoparticles, the CMC-stabilized nanoparticles degraded TCE two times faster based on the $K_{obs}$ value. Comparing the molecular structure of starch and CMC, both macromolecules share an analogous molecular skeleton, consisting of hundreds of glucose units interconnected by a so-called alpha (for starch) or beta linkage (for cellulose or CMC). However, a CMC molecule distinguishes itself from a starch molecule in that the $CH_2OH$ group in the repeating glucose unit is substituted with the $CH_2$—O—$CH_2$—COONa group. As discussed in the FTIR studies, the presence of the carboxymethyl groups in CMC facilitated the enhanced interactions between CMC and the nanoparticles. As a result, CMC was able to stabilize the iron nanoparticles more effectively than starch.

Figure 15:
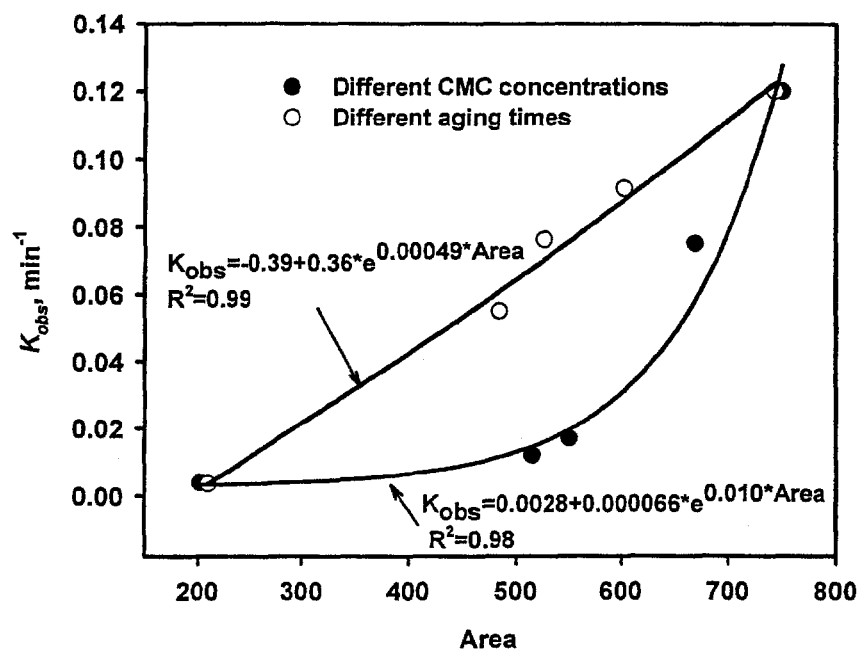
FIG. 15 is a graph correlating the TCE degradation rate constant ($K_{obs}$) with the corresponding area under the UV-Vis spectrum of FIG. 14B for iron-palladium particles stabilized with different concentrations of CMC (solid dots) and iron-palladium particles stabilized at a CMC:iron molar ratio of 0.0124 but with various ages of 5 minutes to 9 days (open dots).

In an attempt to test the possible correlation between the optical characteristics of the nanoparticles and the reaction rate constant, the area (A) under each spectrum in the range of 400-750 nm (FIG. 14B) was measured. Based on the data listed in Table 2, an exponential relationship was identified to exist between the observed rate constant ($K_{obs}$) and the measured under-spectrum area as shown in FIG. 15, i.e. for nanoparticles stabilized with various concentrations of CMC, the following correlation equation holds $$k_{obs} = 0.0028 + 0.000066 \cdot e^{0.010}$$

In addition, a similar exponential relationship was also determined (Eqn (5)) for the fully stabilized (CMC:Fe=0.0124) nanoparticles of various ages (FIGS. 15, 16A and 16B), $$k_{obs} = -0.39 + 0.36 \cdot e^{0.00049 \cdot A}$$

Although the underlying mechanisms are yet to be revealed, these simple correlations mat serve as a predictive means in estimating the relative reactivity of analogous nanoparticles.

Chemical Longevity of the Fe—Pd Nanoparticles. For practical applications (e.g. in-situ injection into contaminated subsurface source zones), the delivery and spatial distribution of the injected nanoparticles in soils are often limited by the slow mass transfer process. Therefore, it is highly desirable

TABLE 2

Observed $K_{obs}$ Values and Area under Each UV-Vis Spectrum for Fe—Pd Nanoparticles Stabilized at Various CMC:Fe Molar Ratios.

Figure 16A:
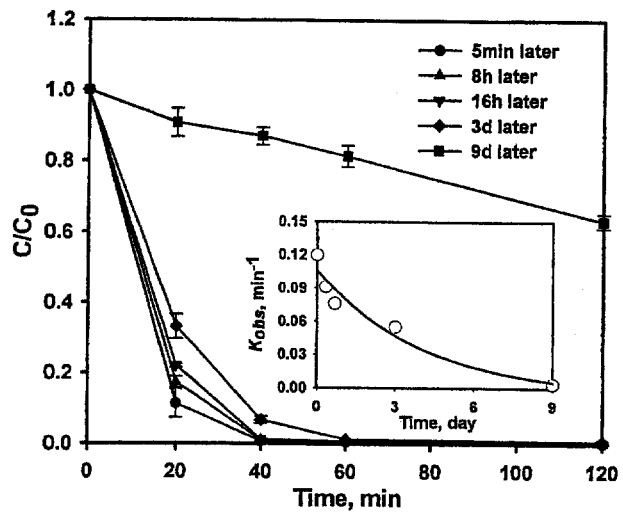
FIG. 16A is a graph of the dechlorination rate of TCE using 0.2% CMC stabilized iron-palladium nanoparticles at various ages.

| CMC:Fe (M/M) | 0 | 0.00124 | 0.00310 | 0.00620 | 0.00930 | 0.0124 |
|---|---|---|---|---|---|---|
| $K_{obs}$ ($min^{-1}$) | 0.0041 | 0.012 | 0.017 | 0.075 | 0.12 | 0.12 |
| Area under spectrum | 201.8 | 514.6 | 549.6 | 668.5 | 749.5 | 743.1 | that the injected nanoparticles offer prolonged reactivity to allow for maximum use of their dechlorination power. This would be almost impossible for the 'naked', non-stabilized nanoparticles. As stated before, because of the extremely high initial reactivity, non-stabilized nanoparticles agglomerate rapidly to minimize the system free energy, thereby losing their high reactivity and soil-permeability in minutes. However, when the iron nanoparticles are stabilized with CMC, the surface chemistry of the iron nanoparticles is greatly changed. First, when a protective layer of CMC molecules is attached to the surface, the nanoparticles tend to repel each other due to the negatively charged carboxylate groups in CMC. On the other hand, the presence of the CMC layer allows the nanoparticles to interact and react with hydrophobic, non-charged chlorinated hydrocarbons such as TCE. Second, the encapsulation of the nanoparticles by CMC prevents the nanoparticles from being oxidized too rapidly by the media, thereby preserving the particles' dechlorinating power for prolonged periods of time. To test the effect of CMC stabilization on the chemical longevity of the nanoparticles, dechlorination rates of TCE were measured and compared for the stabilized Fe—Pd nanoparticles aged from 5 minutes to 9 days. FIG. 16A shows after three days of preparation, the Fe—Pd nanoparticles remained highly reactive for TCE degradation ($K_{obs}$=0.055 min$^{-1}$). After 9 days of aging, the observed TCE degradation rate constant of the Fe—Pd nanoparticles (0.0037 min$^{-1}$) remained comparable to that of fresh but non-stabilized Fe—Pd nanoparticles (Table 2). The gradual reactivity loss of the stabilized iron nanoparticles can be attributed to two main causes. First, although the CMC layer tends to passivate the nanoparticles, the surface of the iron nanoparticles, remains highly reactive, and the surface reaction with media such as dissolved oxygen (DO) and $H_2O$ is occurring although it is much slower than for non-stabilized nanoparticles. Schrick et al. reported that protons from water can be reduced to adsorbed H atoms and to molecular $H_2$ at the surface of non-stabilized Ni—Fe nanoparticles. Second, although agglomeration/precipitation was not visible by naked eyes during the ageing process of the nanoparticles, the TEM images (FIGS. 9B and 9C indicated that even stabilized Fe—Pd nanoparticles were still gradually growing over time, resulting in gradual diminution of the reactive surface area of the particles.

Figure 16B:
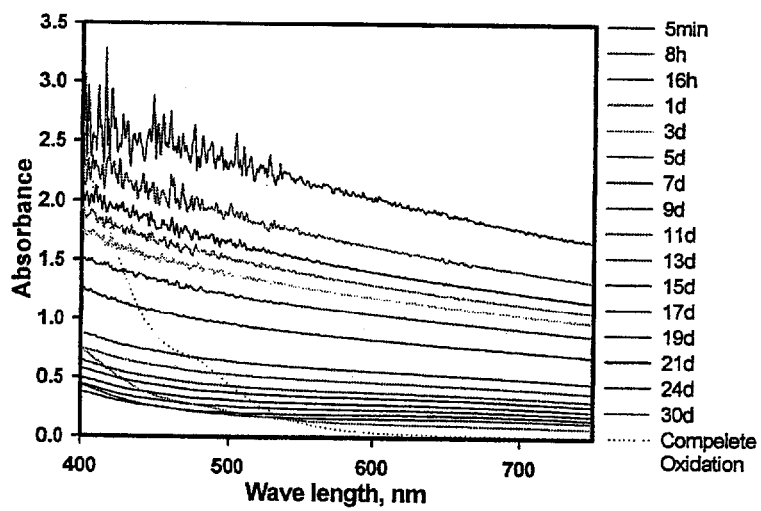
FIG. 16B is a graph of the UV-Vis absorption spectra for solutions containing CMC stabilized iron palladium nanoparticles aged for between 5 minutes and 30 days.

FIG. 16A illustrates dechlorination of TCE using 0.2% CMC stabilized Fe—Pd nanoparticles of various ages. Iron dose was 0.1 g/L as Fe in all cases. Pd to iron ratio was 0.1/100 (w/w). The inset shows the exponential decrease of TCE degradation rate constant ($K_{obs}$) with aging time. FIG. 16B illustrates change in UV-Vis absorption spectra for solutions containing 0.1 g $L_{-1}$ of CMC-stabilized Fe—Pd nanoparticles aged for up to 30 days (Pd/Fe=0.1/100 (w/w)). No degradation was observed in control tests (data not included for brevity).

FIG. 16B shows the UV-vis spectra for the nanoparticles aged for up to 30 days. As the particle age grew, the spectra progressively shifted to a lower level absorbance. It is also noteworthy that for particles younger than 24 days, the patterns of the spectra were nearly parallel to each other; however, for particles older than 24 days, the UV-Vis absorption in the low wavelength region began to rise abruptly and converge to the limiting absorption spectrum of the completely oxidized Fe-CMC solution (obtained in an air-purged sample). This observation indicates that the CMC-stabilized Fe—Pd nanoparticles will be ultimately oxidized or corroded in water over prolonged times.

Completeness of TCE Dechlorination. It is well known that TCE degradation undergoes a series of reaction steps, and toxic intermediates such as VC and DCE must be eliminated rapidly, which justifies the pivotal importance of reaction kinetics in the environmental dechlorination processes. During the course of TCE degradation by CMC stabilized Fe—Pd nanoparticles, halogenated intermediates, such as vinyl chloride (VC), cis- or trans-dichloroethene (DCE), were not detected. Trace amounts (~25 μg/L) of 1,1-DCE were detected in the initial stage of TCE degradation, however, it became non-detectable after 20 minutes.

Figure 17:
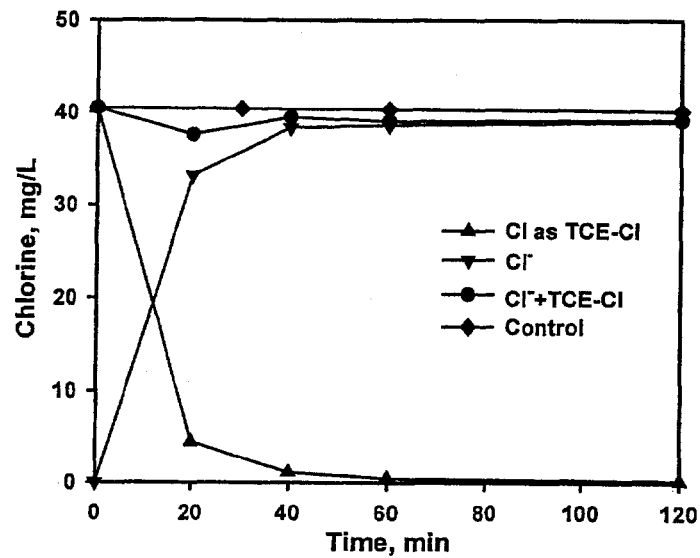
FIG. 17 is a graph illustrating the evolution of chloride during dechlorination of TCE using CMC stabilized iron-palladium nanoparticles.

Since chloride is a final dechlorination product, the degree of the TCE-dechlorination completeness can be measured by monitoring the coupled TCE degradation rate and chloride production rate in batch experiments. FIG. 17 shows that the chloride production rate is nearly stoichiometrically coupled with TCE degradation rate during the two-hour degradation of TCE using the CMC-stabilized Fe—Pd nanoparticles (Note: TCE remaining is reflected by the amount of Cl that remains associated with TCE, denoted as TCE-Cl). The nearly perfect chlorine mass balance indicates that for each mg $L^{-1}$ of TCE-Cl depleted, nearly the same amount of chloride was formed, indicating rapid and nearly complete dechlorination of TCE. The total Cl (sum of chloride ion and TCE-Cl) displayed a minor dip at ~20 minute of TCE reduction, suggesting that small quantities (<7.2%) of chlorinated intermediates were formed in the early stage. However, these chlorinated intermediates were rapidly degraded. At steady state (>40 minutes), the sum of TCE-Cl and Cl$^-$ accounted for more than 96% of the total chlorine in the system.

We claim:

1. A method of making a stabilized, chemically reactive, metallic nano-material effective for degradation of chlorinated organic compounds in soil and groundwater, the method comprising the steps of:
preparing a solution of iron and carboxymethyl cellulose; and
reducing the iron under inert conditions to form iron nanoparticles comprising zero valent iron (Fe°).

2. The method of claim 1 wherein the solution comprises iron at a concentration of from about 1.0 to about 2.5 grams/liter.

3. The method of claim 1 wherein the solution contains from about 0.2 to about 1.0% by weight of the carboxymethyl cellulose.

4. The method of claim 1 wherein the solution comprises $Fe^{2+}$ Or $Fe^{3+}$.

5. The method of claim 1, wherein the molar ratio of carboxymethyl cellulose to iron in the solution is no more than 0.0124.

6. The method of claim 1, wherein the molar ratio of carboxymethyl cellulose to iron in the solution is no more than 0.00930.

7. The method of claim 1 wherein the solution comprises $Fe^{3+}$ and the $Fe^{3+}$ is reduced to zero valent iron (Fe°).

8. A process for reductive dechlorination of a chlorinated organic compound, comprising the steps of:
preparing a iron nanoparticle in accordance with claim 7; and
contacting the iron nanoparticle with the chlorinated organic compound.

9. The method of claim 1 wherein the carboxymethyl cellulose is sodium carboxymethyl cellulose.

10. The method of claim 1 wherein the step of reducing comprises adding a reducing agent to the solution.

11. The method of claim 10 wherein a stoichiometric amount of the reducing agent is added to the solution based on the concentration of iron in the solution.

12. The method of claim 10 wherein the reducing agent is selected from the group consisting of sodium borohydride, sodium aluminum hydride, metal hydrides, metal naphthalides, hydrazine, alcohols, and combinations thereof.

13. The method of claim 10 wherein the reducing agent is sodium borohydride.

14. The method of claim 1 further including the step of applying a vacuum while reducing the iron.

15. The method of claim 1 further comprising, after the step of reducing, coating the iron nanoparticles with a secondary metal.

16. The method of claim 15 wherein the secondary metal is selected from the group consisting of palladium (Pd), platinum (Pt), copper (Cu), nickel (Ni), aluminum (Al), rhodium (Rh), iridium (Ir) and osmium (Os).

17. The method of claim 15 wherein the secondary metal comprises palladium.

18. The method of claim 15 wherein the step of coating comprises adding from about 0.05 to about 0.1% by weight of the secondary metal to the solution containing the iron nanoparticle.

19. A process for reductive dechlorination of a chlorinated organic compound, comprising the steps of:
preparing a iron nanoparticle in accordance with claim 15; and
contacting the iron nanoparticle with the chlorinated organic compound.

20. A process for reductive dechlorination of a chlorinated organic compound, the process comprising the steps of:
preparing a iron nanoparticle in accordance with claim 1; and
contacting the iron nanoparticle with the chlorinated organic compound.

21. The process of claim 20 wherein the chlorinated organic compound is selected from the group consisting of polychlorinated biphenyls (PCBs), trichloroethylene (TCE) tetrachloroethylene (PCE), vinyl chloride (VC), cis-dichloroethene (c-DCE), trans-dichloroethene (t-DCE), and combinations thereof.

22. The process of claim 20 wherein the step of contacting comprises injecting the iron nanoparticle into a site contaminated with a chlorinated organic compounds.

23. The process of claim 22 wherein the site comprises a soil subsurface.

24. The process of claim 22 wherein the site comprises groundwater.

25. The process of claim 20 wherein the chlorinated organic compound is in a soil subsurface location and the chlorinated organic compound is dechlorinated in-situ.

* * * * *